(12) United States Patent
Potiagalov et al.

(10) Patent No.: US 10,152,560 B2
(45) Date of Patent: *Dec. 11, 2018

(54) GRAPH DATABASE QUERYING AND VISUALIZATION

(71) Applicant: Business Objects Software Limited, Dublin (IE)

(72) Inventors: Alexei Potiagalov, Richmond (CA); Sarah Menard, South San Francisco, CA (US); Paul Ekeland, Dublin (IE); Ivailo Ivanov, Vancouver (CA)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 307 days.

This patent is subject to a terminal disclaimer.

(21) Appl. No.: 14/973,113

(22) Filed: Dec. 17, 2015

(65) Prior Publication Data

US 2017/0177681 A1 Jun. 22, 2017

(51) Int. Cl.
*G06F 17/30* (2006.01)

(52) U.S. Cl.
CPC .. *G06F 17/30958* (2013.01); *G06F 17/30572* (2013.01)

(58) Field of Classification Search
CPC combination set(s) only.
See application file for complete search history.

(56) References Cited

U.S. PATENT DOCUMENTS

| | | |
|---|---|---|
| 8,935,129 B1 | 1/2015 | Gao et al. |
| 9,172,621 B1 * | 10/2015 | Dippenaar ............. H04L 41/18 |
| 2004/0239674 A1 | 12/2004 | Ewald et al. |
| 2007/0178473 A1 | 8/2007 | Chen et al. |
| 2007/0192306 A1 * | 8/2007 | Papakonstantinou ........................ G06F 17/30864 |
| 2007/0266039 A1 | 11/2007 | Boykin et al. |
| 2014/0040300 A1 | 2/2014 | Narayanan et al. |

(Continued)

OTHER PUBLICATIONS

Internet article "neo4j", retrieved from http://neo4j.com/why-graph-databases. Retrieved and printed on Dec. 17, 2015.

(Continued)

*Primary Examiner* — Shyue Jiunn Hwa
(74) *Attorney, Agent, or Firm* — Fountainhead Law Group P.C.

(57) ABSTRACT

Embodiments provide for querying and visualization of query results of graph data. An engine processes graph data to create metadata (e.g., in JSON format) identifying at least different node types and edge types that are present in a graph database. An overview visualization simplifies presentation of graph data by depicting only various different node types and graph types. The overview visualization may form the basis for formulating queries including the metadata, which are then promulgated to the graph database. Returned query results may be visualized as an overview or on a detailed node level, promoting insight and formulation of additional queries including node/edge type metadata. The engine may convert graph data query results into tabular form for consumption by relational database analytical tools. According to particular embodiments, an engine of an in-memory database may be particularly suited to perform graph data visualization, querying, and/or tabular conversion tasks.

12 Claims, 25 Drawing Sheets

(56) References Cited

U.S. PATENT DOCUMENTS

| | | | |
|---|---|---|---|
| 2015/0363644 A1* | 12/2015 | Wnuk | G06T 11/206 |
| | | | 382/103 |
| 2016/0188789 A1* | 6/2016 | Kisiel | G06F 19/28 |
| | | | 703/11 |
| 2016/0203234 A1 | 7/2016 | Piccand et al. | |
| 2016/0239545 A1 | 8/2016 | Stetson et al. | |
| 2017/0177744 A1 | 6/2017 | Potiagalov et al. | |

OTHER PUBLICATIONS

Internet article "The Open Graph Viz Platform," retrieved from https://gephi.org. Retrieved and printed on Dec. 17, 2015.

\* cited by examiner

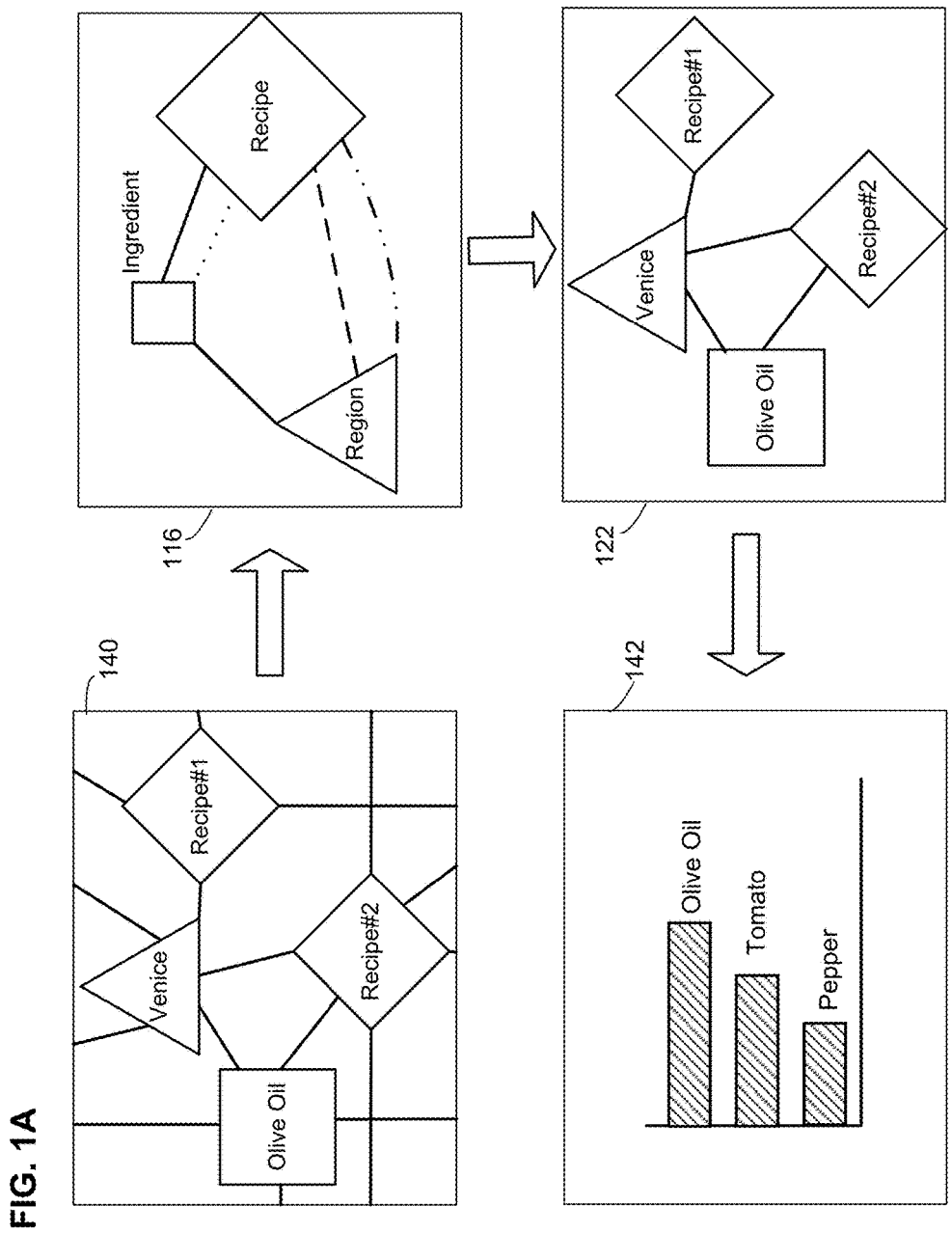

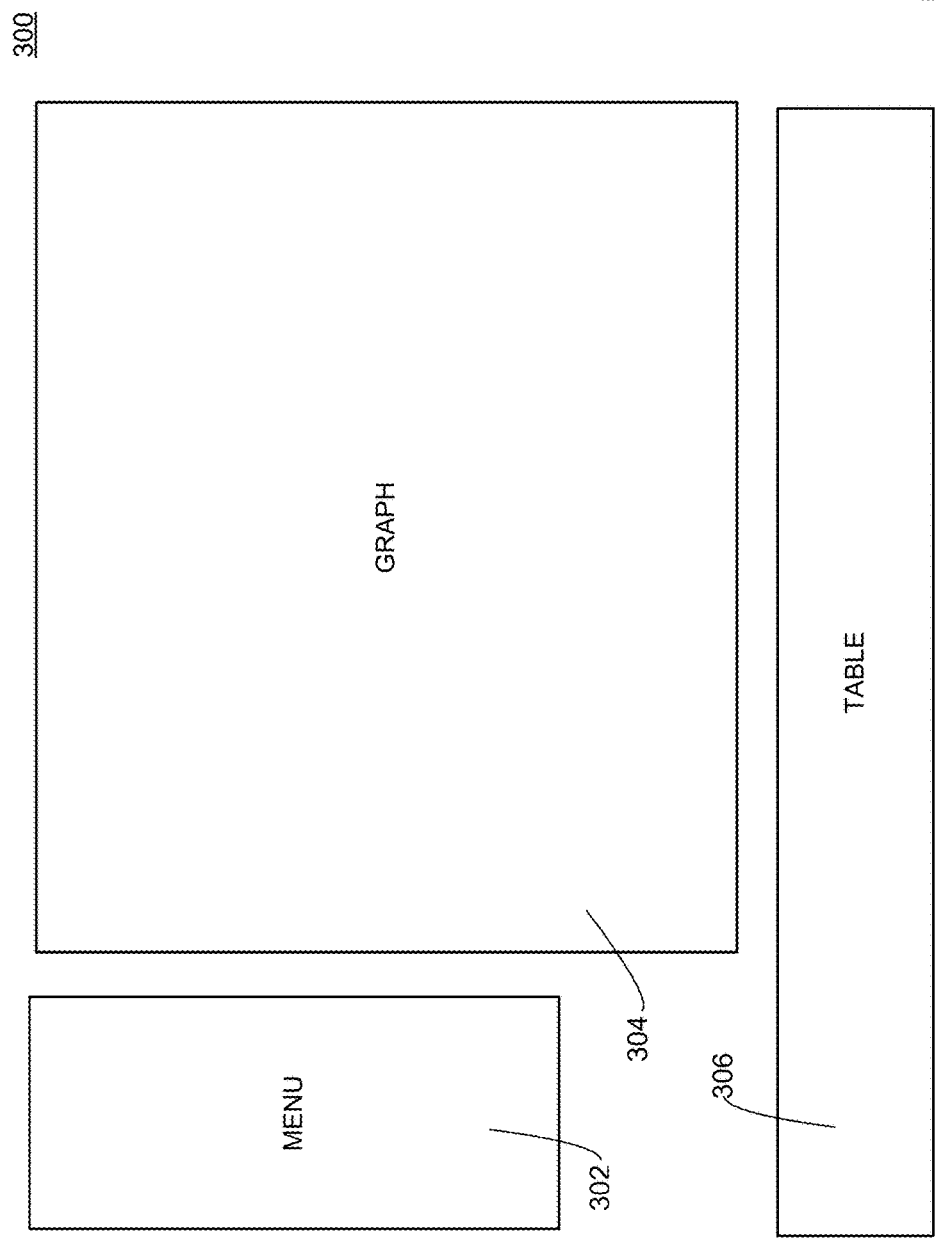

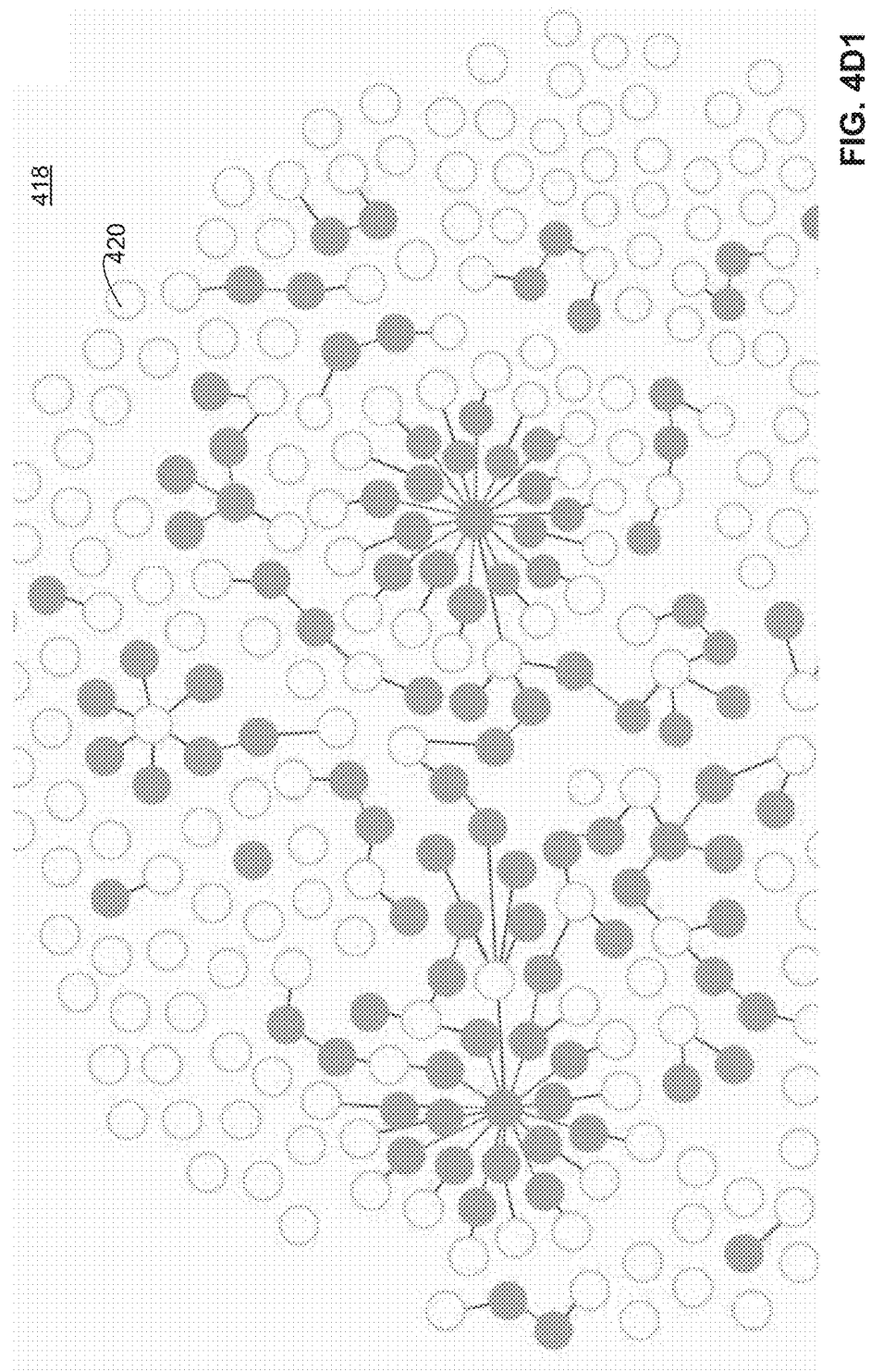
FIG. 4D1

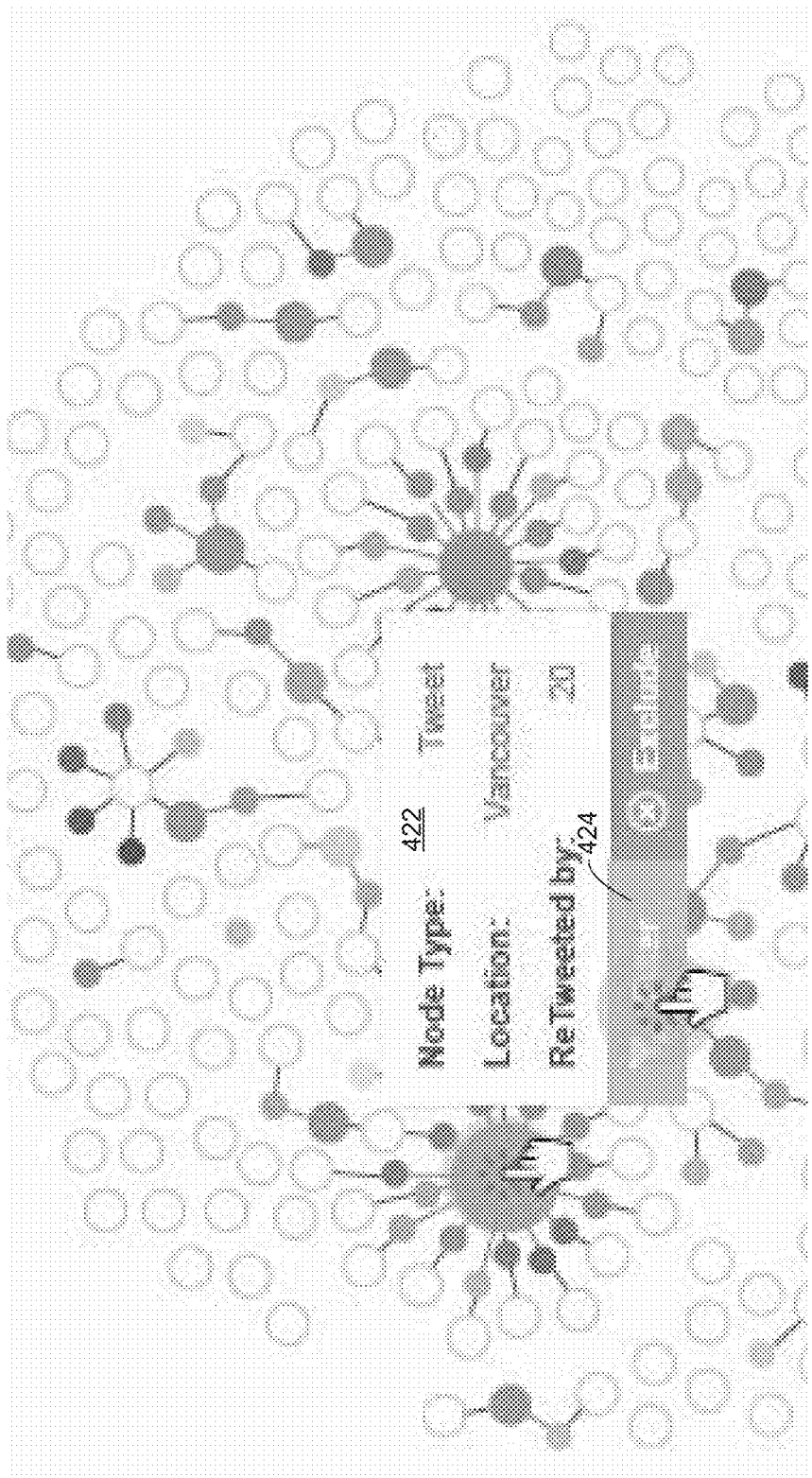
FIG. 4E1

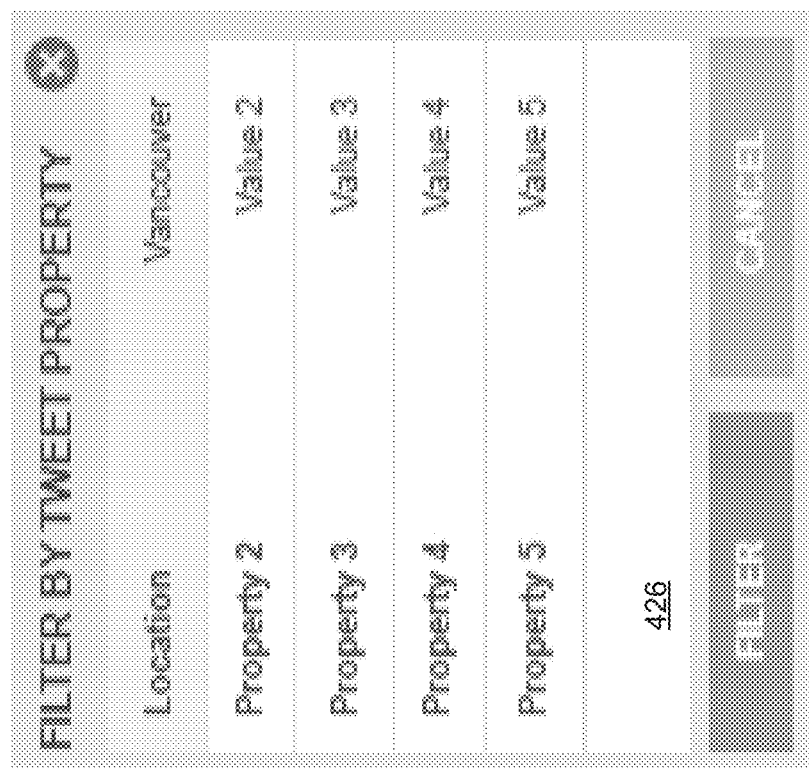
FIG. 4E2

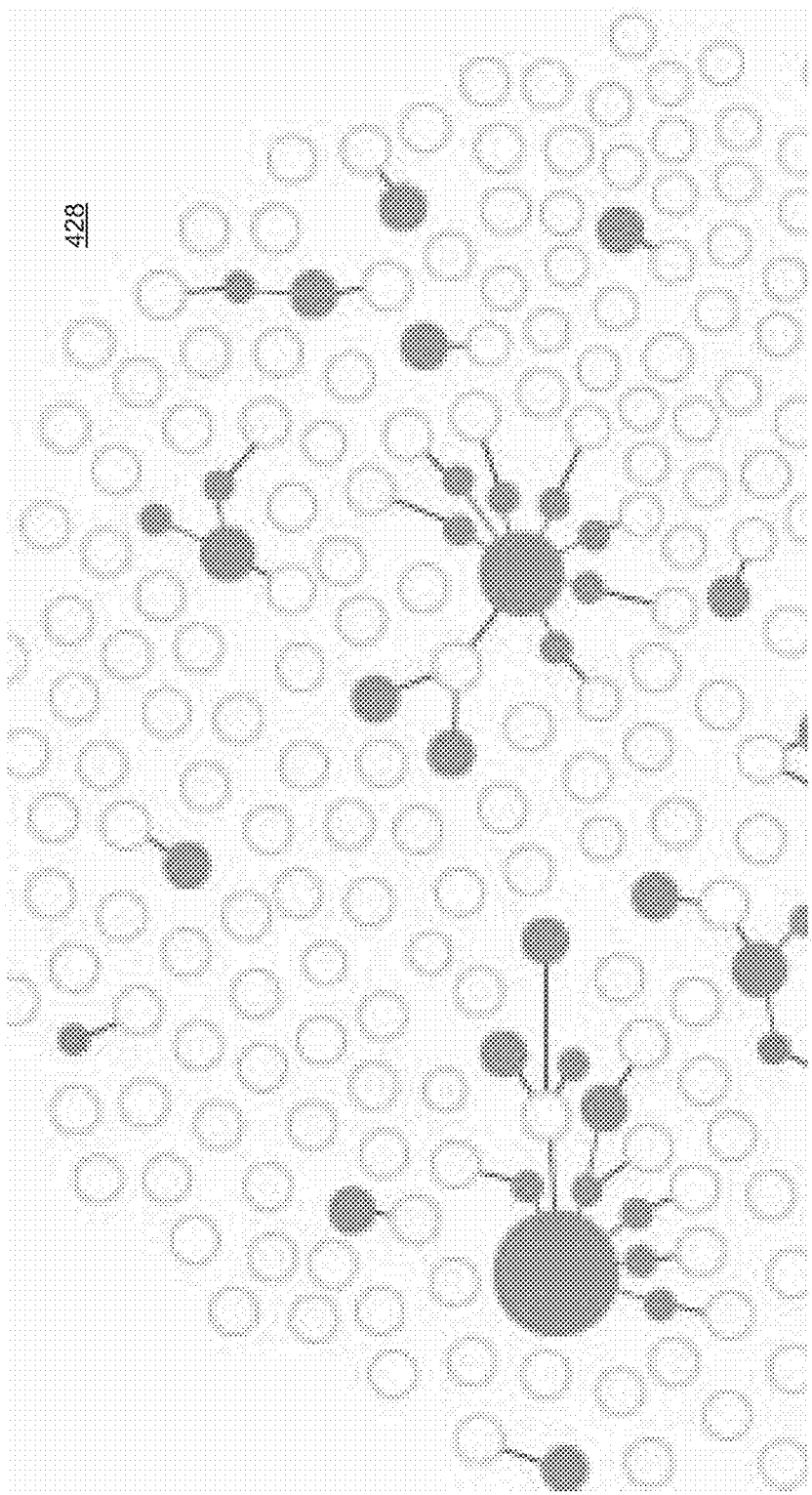
FIG. 4E3

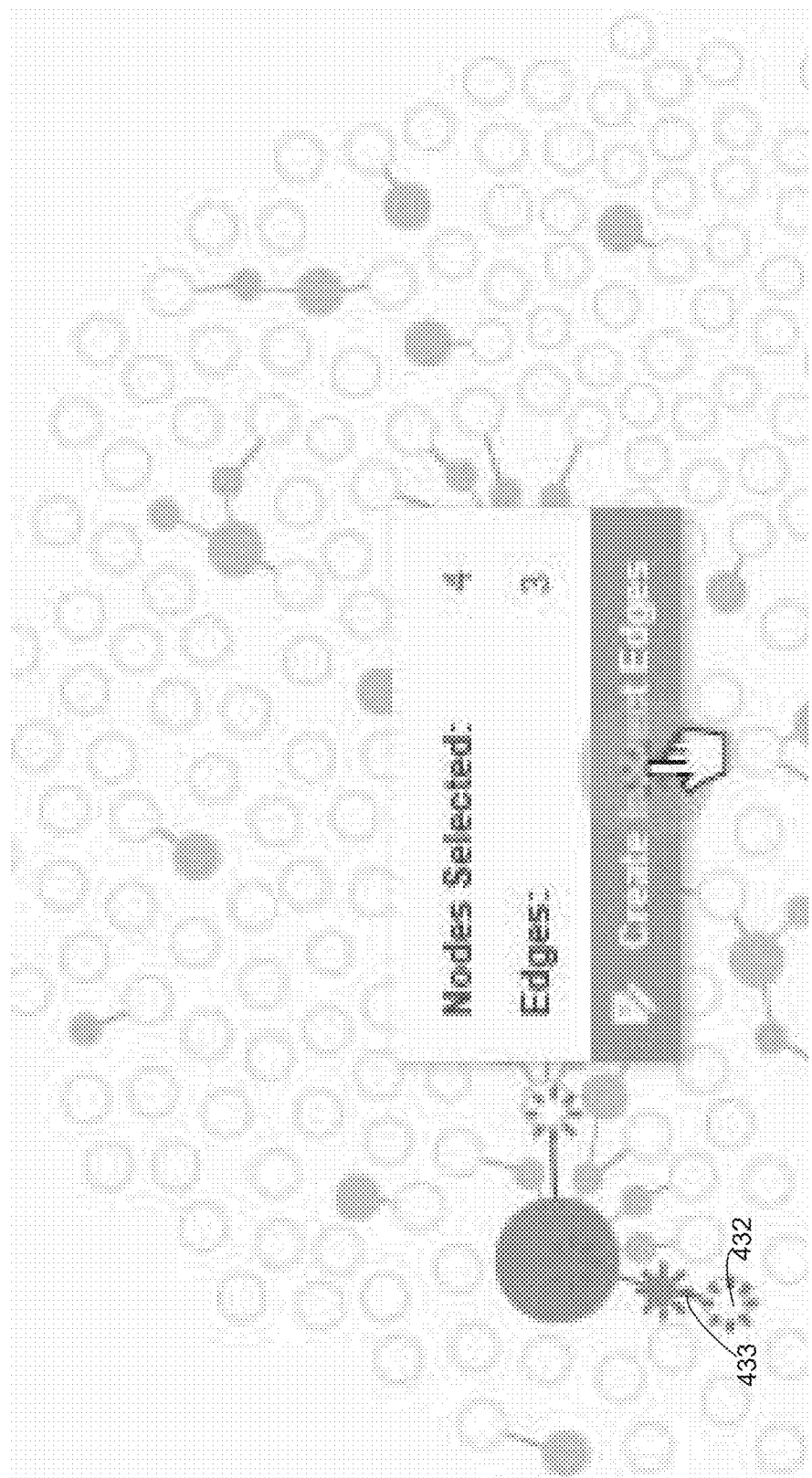
FIG. 4F1

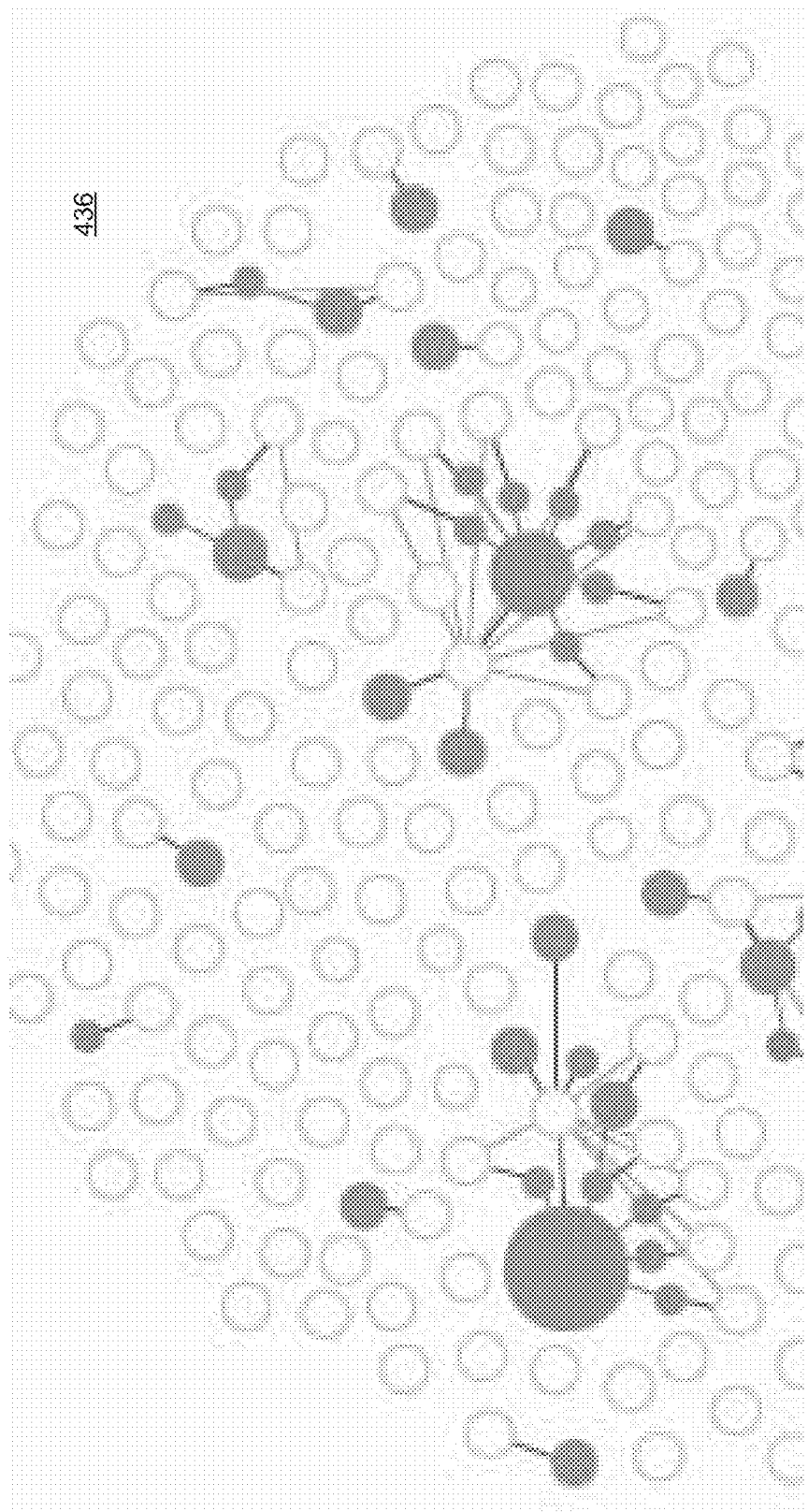
FIG. 4G1

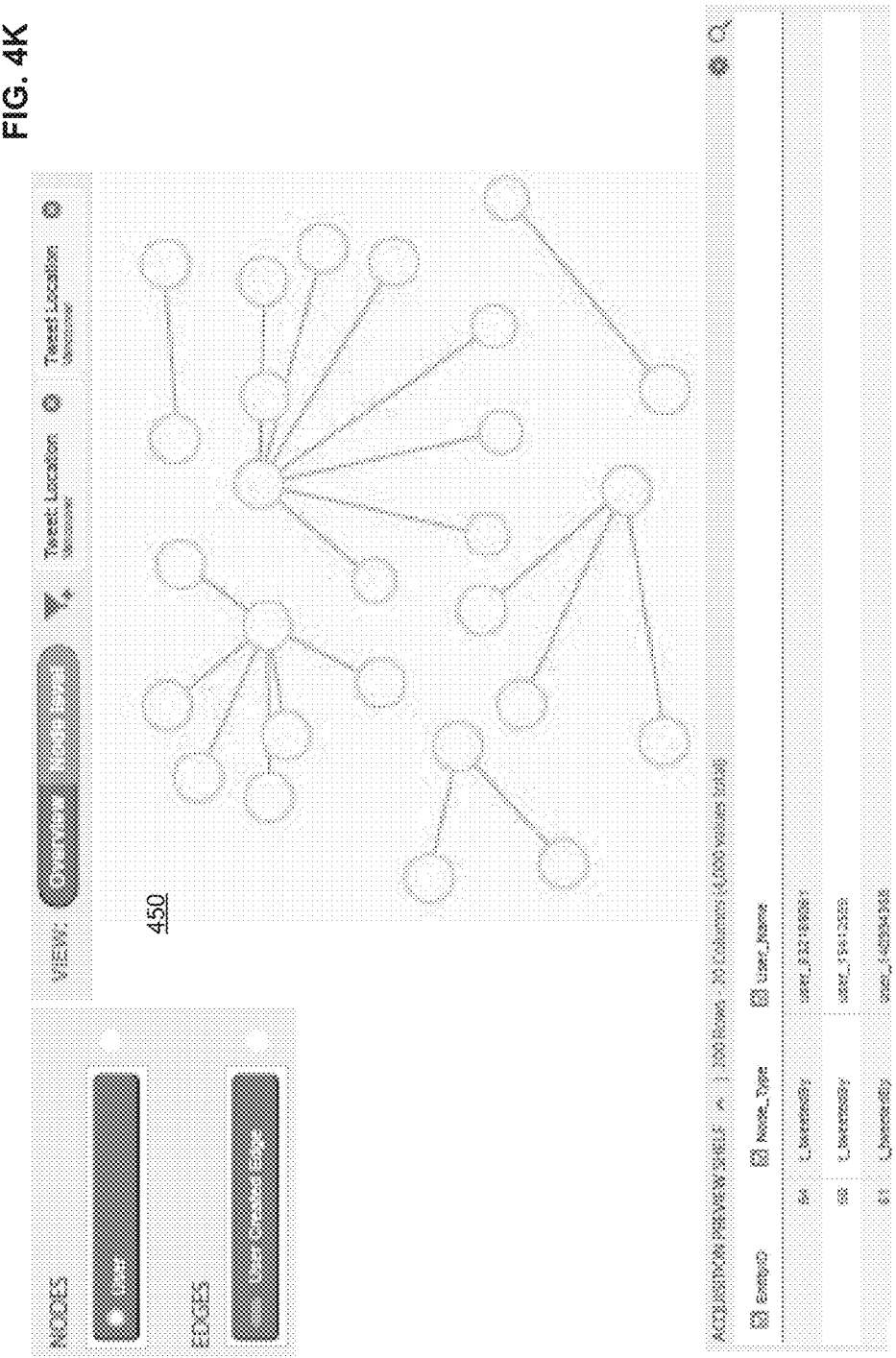

GRAPH DATABASE QUERYING AND VISUALIZATION

BACKGROUND

Unless otherwise indicated herein, the approaches described in this section are not prior art to the claims in this application and are not admitted to be prior art by inclusion in this section.

Embodiments relate to visualization and/or querying of graph database data. Graph data comprises a plurality of nodes (typically of different types), that are connected together in various ways with links (also typically of different types).

Conventionally, graph data may be visualized as a shape representing the nodes, and connecting lines representing the links between nodes. These links are also referred to herein as edges.

Where the volume of data in a graph exceeds a certain amount (e.g., >200 nodes), visual representations thereof may be difficult to understand and navigate. In such conventional representations, a sheer number of links can overwhelm the chart, an effect exacerbated by small screen sizes of mobile devices (e.g., cell phones) that are increasingly being adopted by users for purposes of reviewing and manipulating graph data.

In common applications, however, a graph having less than about 200 nodes would be considered small. Real life graphs can easily number in the millions of different nodes.

For example, a social network application may have millions of users. Moreover, the user may represent just one type of node. Other examples of nodes stored in a graph database of social network data, could include products, locations, trips, etc.

SUMMARY

Embodiments provide for querying and visualization of query results of graph data. An engine processes graph data to create metadata (e.g., in JSON format) identifying at least different node types and edge types that are present in a graph database. An overview visualization simplifies presentation of graph data by depicting only various different node types and graph types. The overview visualization may form the basis for formulating queries including the metadata, which are then promulgated to the graph database. Returned query results may be visualized as an overview or on a detailed node level, promoting insight and formulation of additional queries including node/edge type metadata. The engine may convert graph data query results into tabular form for consumption by relational database analytical tools. According to particular embodiments, an engine of an in-memory database may be particularly suited to perform graph data visualization, querying, and/or tabular conversion tasks.

An embodiment of a computer-implemented method comprises, an engine accessing metadata associated with graph data of a graph database, the metadata identifying a plurality of nodes of a first node type, a plurality of nodes of a second node type, and a plurality of edges of a first edge type between the plurality of nodes of the first node type and the plurality of nodes of the second node type. The engine formulates a query including the metadata. The engine promulgates the query to the graph database. The engine receives from the graph database, a query result responsive to the query.

A non-transitory computer readable storage medium embodies a computer program for performing a method comprising an engine accessing metadata associated with graph data of a graph database, the metadata identifying a plurality of nodes of a first node type, a plurality of nodes of a second node type, and a plurality of edges of a first edge type between the plurality of nodes of the first node type and the plurality of nodes of the second node type. The engine formulates a query including the metadata. The engine promulgates the query to the graph database. The engine receives from the graph database a query result responsive to the query. The engine displays the query result in an overview visualization representing all nodes of the first node type as a single node, all nodes of the second node type as another single node, and edges of the first edge type as a single edge between the single node and the other single node.

An embodiment of a computer system comprises one or more processors and a software program, executable on said computer system. The software program is configured to cause an in-memory database engine to access from an in-memory database, metadata associated with graph data of a graph database, the metadata identifying a plurality of nodes of a first node type, a plurality of nodes of a second node type, and a plurality of edges of a first edge type between the plurality of nodes of the first node type and the plurality of nodes of the second node type. The software program is configured to cause an in memory database engine to formulate a query including the metadata. The software program is configured to cause an in memory database engine to promulgate the query to the graph database. The software program is configured to cause the in memory database engine to receive from the graph database a query result responsive to the query.

Certain embodiments further comprise the engine displaying the query result in an overview visualization representing all nodes of the first node type as a single node, all nodes of the second node type as another single node, and edges of the first edge type as a single edge between the single node and the other single node.

In some embodiments the metadata is in JavaScript Object Notation (JSON) format.

Particular embodiments further comprise the engine converting the query result into a table.

In various embodiments the converting is based upon the engine receiving an input specifying the first node type.

According to certain embodiments the converting is based upon the engine receiving an input specifying the first edge type.

In specific embodiments the converting is based upon the engine receiving an input specifying a plurality of edge types and a plurality of node types displayed in an overview visualization of the query result.

Some embodiments further comprise the engine displaying the query result in a node level visualization rendering, each of the plurality of nodes of the first node type and each of the plurality nodes of the second node type as separate nodes. The engine displays each of the plurality of edges of the first edge type as separate edges.

In some embodiments the metadata is stored in an in-memory database, and the engine comprises an in-memory database engine.

The following detailed description and accompanying drawings provide a better understanding of the nature and advantages of embodiments.

BRIEF DESCRIPTION OF THE DRAWINGS

FIG. 1A shows various interface screens according to the simplified embodiment of FIG. 1.

FIG. 3 provides a simplified diagram illustrating a generic view of an interface screen according to an example.

FIGS. 4A-K show various screenshots of interface screens in the example.

DETAILED DESCRIPTION

Described herein are methods and apparatuses affording visualization and/or querying of graph data. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments utilize the structure of a graph as an alternative way to represent graph database data to a user, while affording more intuitive interaction with and analysis of that data. In particular, while a typical graph may store millions of nodes and edges, a number of different types of those nodes and edges is generally significantly smaller. For example an average graph may comprise only about 5-10 different types of nodes, and only about 10-20 different edge types.

Rendering a graph's structure as a graph where node types become nodes and edge types become links, thus greatly reduces a number of components to be depicted. This simplified visualization facilitates user comprehension of the graph and its constituent data, even for graphs having a large total number of nodes.

In the interface, a user can switch between a simplified overview of the graph's structure, and a more detailed node-level view. These two visualizations work together to afford the user with both a high level view (helpful for query formation) and lower level view (helpful for analysis of query results).

Figure 1:
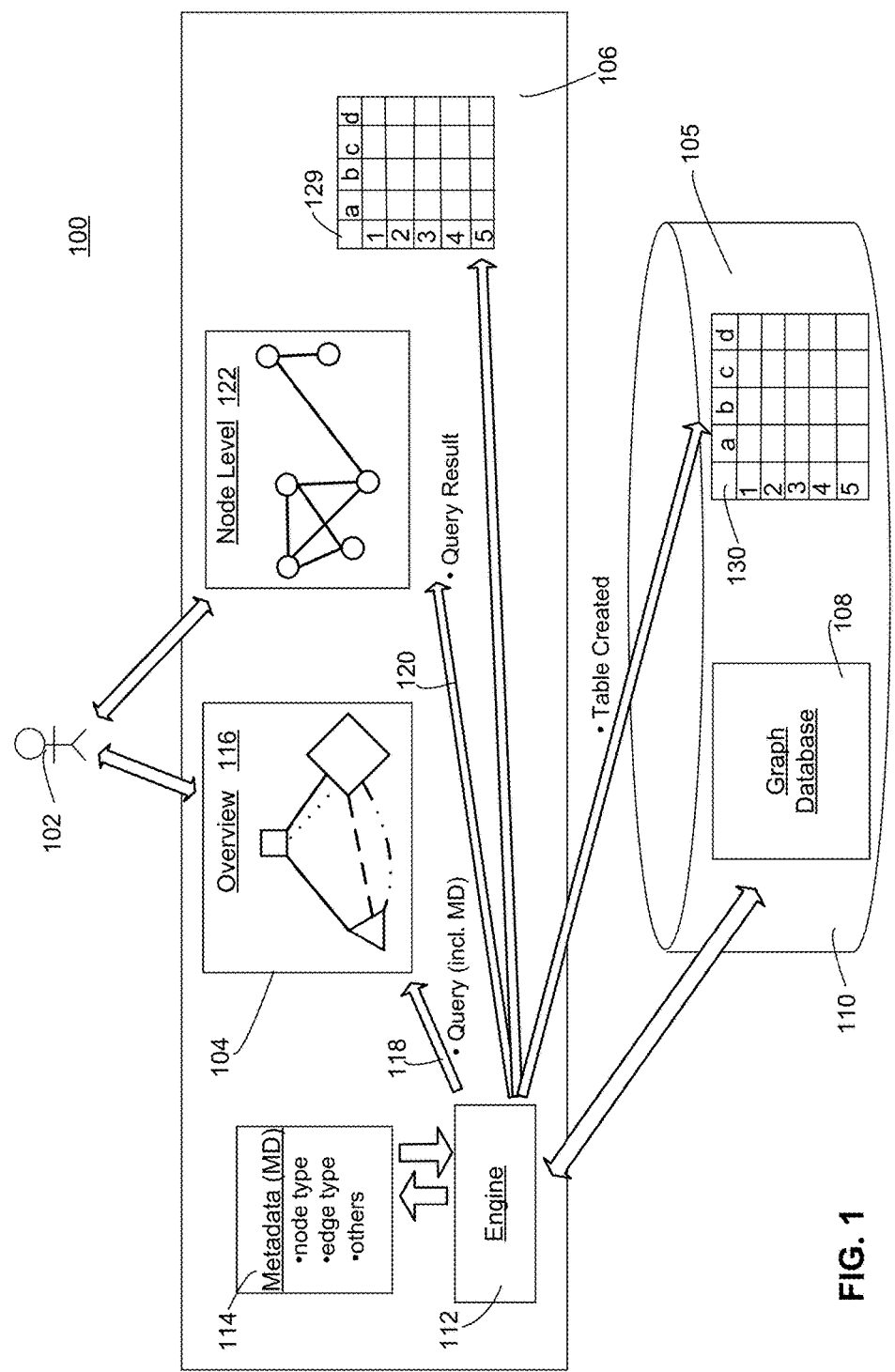
FIG. 1 shows a simplified block diagram of a system according to an embodiment.

FIG. 1 presents a simplified view of a system 100 according to an embodiment. User 102 interacts with an interface 104 of an application layer 106 to access graph data stored in an underlying graph database 108 stored in a non-transitory computer readable storage medium 110.

Engine 112 of the application layer functions to generate metadata 114 from the graph database. This metadata identifies nodes and edges by type, and can include a variety of additional types of information, such as other properties (e.g., number) of nodes/edges.

Based upon the metadata, the engine provides an overview 116 of the graph data. That overview includes separate icons depicting only different types of graph nodes and different types of graph edges, rather than a total number of nodes/edges. This substantially simplifies the representation of the overview display.

In an overview screen, a size of a node may reflect some quantitative aspect relating to that node type. For example, node size could reflect a number of nodes of a particular type. Node type size could also reflect a value of some aggregated property, e.g., sum (annual income).

Based upon insights provided by the simplified depiction of graph data in the overview, a user can formulate one or more queries 118 to the graph database. Those queries can include the metadata generated by the engine.

FIG. 1 further shows the return of a query result 120 that is returned in response to the query. Here, the query result is shown in a node level view 122, in which the number of nodes/edges satisfying the query parameters, are separately shown. While potentially complex, this node-level view should be assimilatable by the user, given that it reflects only graph data satisfying specific query parameters.

Moreover, under certain circumstances the graph data satisfying the query may be amenable to conversion into tabular form 129, for storage in an underlying relational database 130. This conversion may be performed by the engine, allowing for analysis of the graph data utilizing a wide array of available tools and approaches that are limited to recognizing data in table form.

FIG. 1A shows an example of various enlarged interface screens that may be generated and offered to a user as described above. This figure presents a highly simplified depiction of graph database data in a culinary context.

In particular, an initial node level view 140 may be quite complex, depicting nodes of a first type for different recipes. Those nodes in turns have links to another node type representing a geographic region from which they originate. Another node type is a specific ingredient for various recipes.

The original, full graph dataset may also include a panoply of links to other node types (not shown). Examples could include but are not limited to sources for recipes, as well as categories of ingredients (e.g., vegan, vegetarian, fish, etc.)

In order to simplify this initial node level view, the engine may generate the overview screen 116 that depicts only node type and edge type. Here, in this highly simplified example, the number of icons is reduced to three: ● Recipe, ● Region, and ● Ingredient. Moreover, the number of links between those icons is also reduced according to link type, thereby substantially simplifying this overview screen.

Insight into the graph data afforded by the overview, may allow a user to formulate and promulgate a query to the graph dataset. The results of that query are shown in the node level view 122, where both recipes are shown linked to the region of Venice, with only one having olive oil as an ingredient.

The simplified query result may in turn be amenable to conversion into tabular form for storage in a relational database (such as an in-memory database). The interface screen 142 shows the rendering of such graph database data converted into tabular form, as a horizontal bar chart visualization.

Returning to FIG. 1, that figure shows the metadata generated by the engine, as being present in the application layer. However, this is also not required and in certain embodiments the metadata could be stored in an underlying non-transitory storage medium, the same as or different from that storing the graph database and converted tabular data.

And while FIG. 1 shows the graph database and converted tabular data as being stored in the same non-transitory computer readable storage medium, this is also not required. In various embodiments the graph database, metadata, and/or converted tabular data could be stored in various different non-transitory computer readable storage media.

Moreover, while FIG. 1 shows the engine as being present in the application layer, this is also not required. In certain embodiments the engine could be present in the underlying database, for example a powerful engine of an in-memory database such as the HANA database available from SAP SE of Walldorf, Germany. Such a configuration is shown and discussed later below in connection with FIG. 5.

Figure 2A:
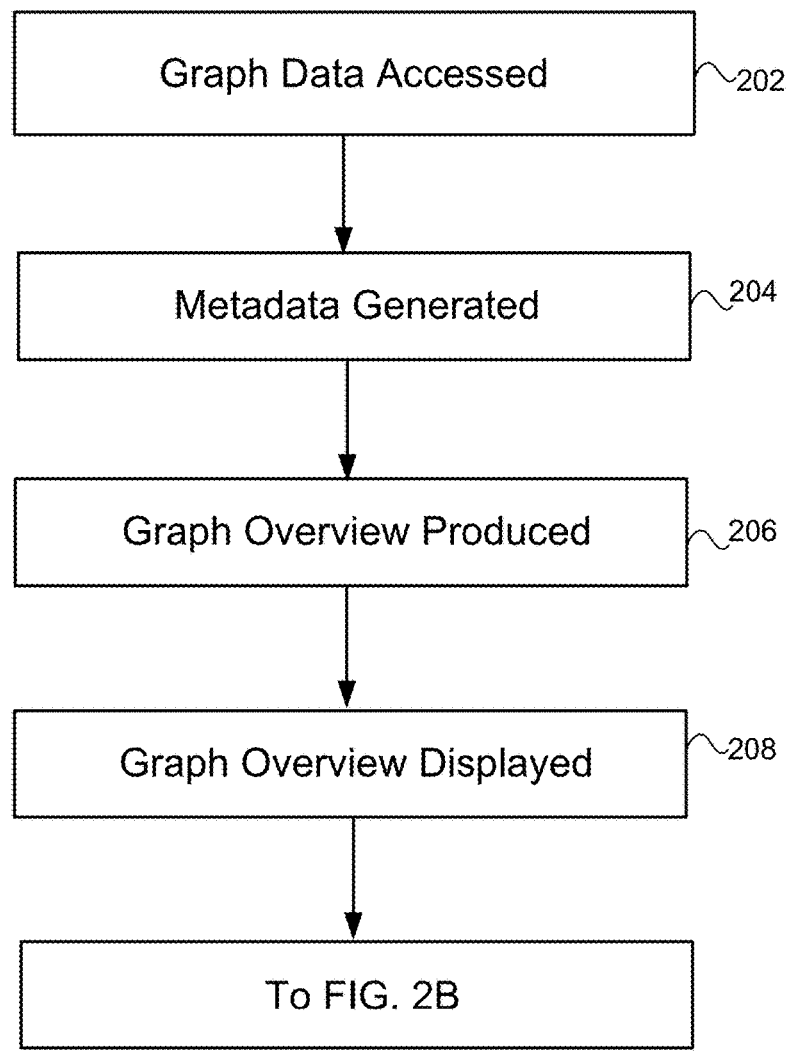
FIGS. 2A-2C show a simplified flow diagram of a method according to an embodiment.
Figure 2B:
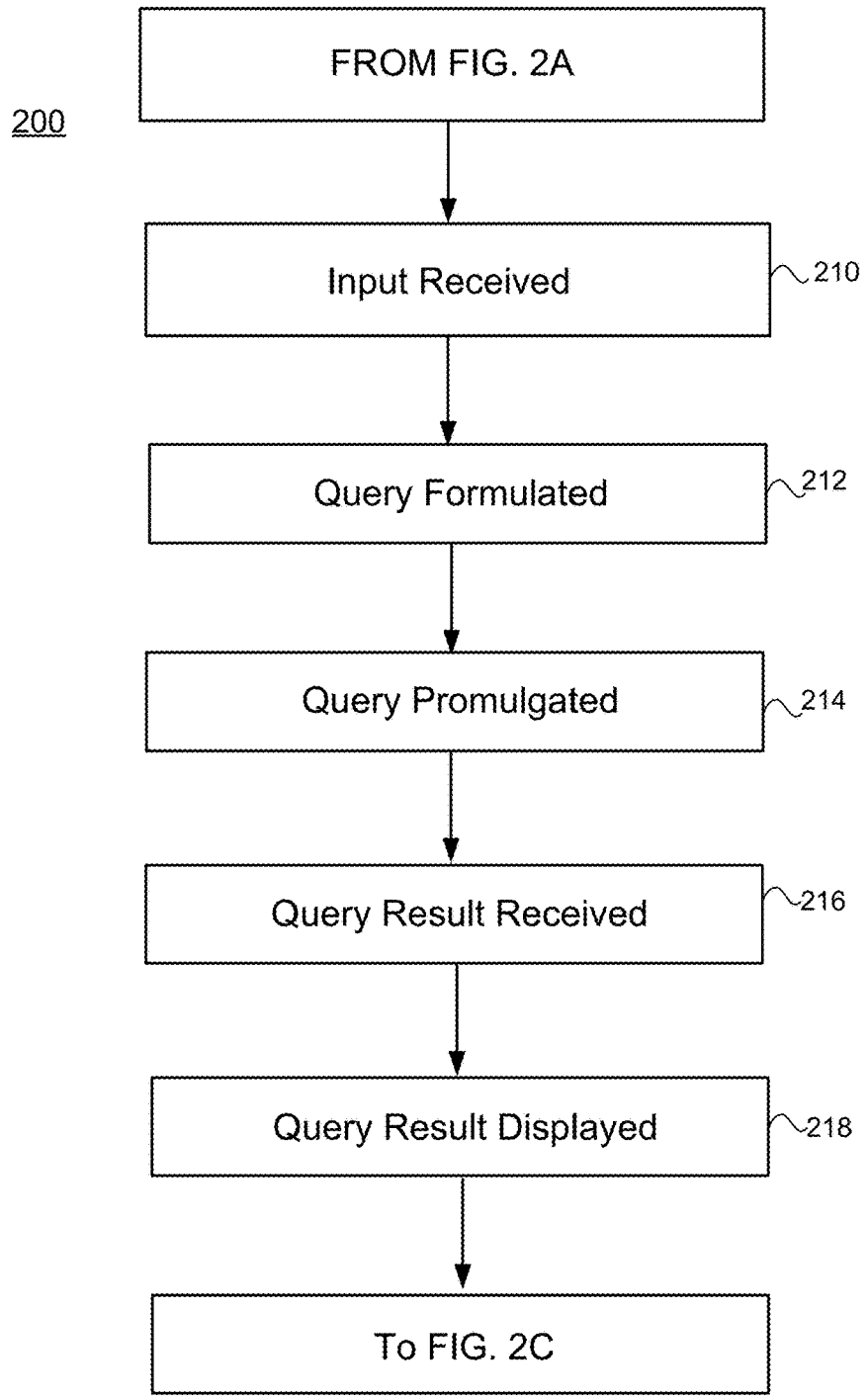
Figure 2C:
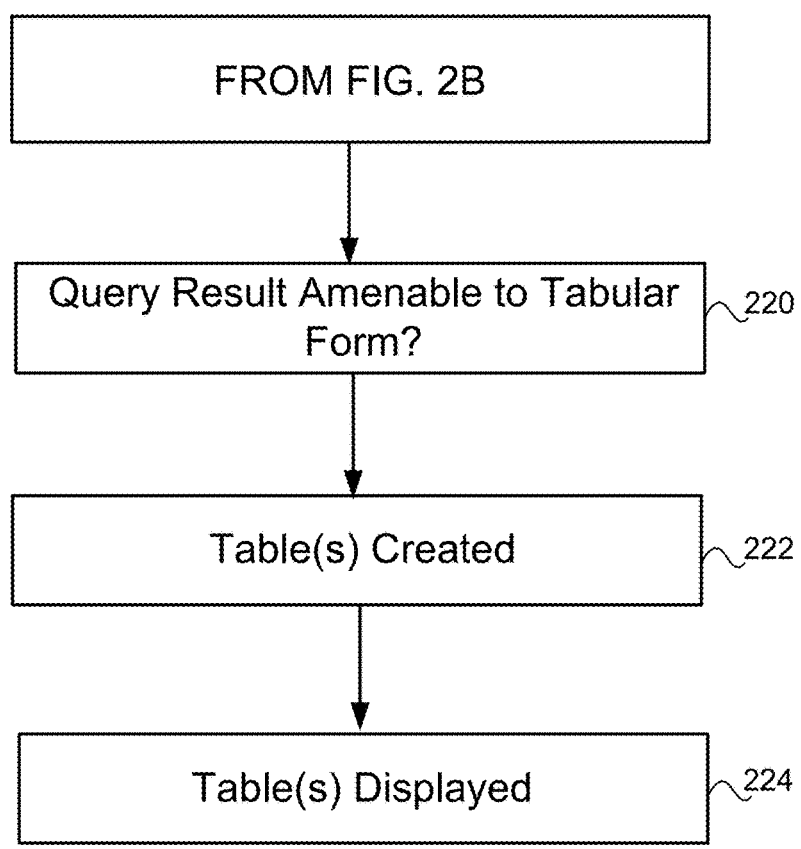

FIGS. 2A-C show a simplified flow diagram of a method 200 according to an embodiment. In a first step 202, an engine accesses graph data stored in an underlying graph database.

In a second step 204, the engine processes the graph data to generate associated metadata. That metadata reflects at least the various different types of nodes and edges that are present in the graph data. As mentioned above, the number of different node types and edge types is typically much smaller than the total number of nodes/edges in the dataset of the graph database.

In certain cases the graph database may already include metadata describing node and/or edge type. One example of such a database is the HANA in-memory database available from SAP SE of Walldorf, Germany. There, the HANA in-memory database may pre-declare a node type utilizing a label. In such embodiments, the engine processes the label to produce the metadata including node type, in a general format (e.g., one also compatible with generating metadata from scratch from a graph database other than HANA).

In a third step 206, the engine processes the graph data and the associated metadata to produce an overview visualization representing nodes as different node types, and edges as different edge types. In a fourth step 208, the engine displays the overview visualization.

In a fifth step 210, the engine receives a first user input to the overview visualization. In a sixth step 212, based upon the first user input and the graph data, the engine composes a query including at least a part of the associated metadata.

In a seventh step 214, the engine promulgates the query to the graph database. As mentioned above, the query may be applied to all or only a subset of the graph data.

In an eighth step 216, the engine receives a corresponding query result. In a ninth step 218, responsive to a second user input, the engine displays the query result in a detailed node level view showing a plurality of nodes of a same type.

In a tenth step 220, the engine determines whether the query result is amenable to display in tabular form. If so, in an eleventh step 222 the engine creates the corresponding table(s). In a twelfth step 224, the engine displays the table(s).

Certain embodiments may offer two options for table conversion. One option may be to select a node type for conversion.

Another option may be to select an edge type for conversion. Selecting an edge type may result in the selection of two node types and one of the edge types joining them.

Other embodiments may allow selecting several node types and edge types. As long as a path connects these elements in the overview graph, it is possible to convert such graph data into tabular form.

Embodiments may offer one or more benefits to the process of analyzing and/or visualizing graph data. For example the ability to switch between an overview of graph structure based upon node/link types, and a detailed node-level view, provides the user with a way to control in the granularity of their analysis in a manner that feels both natural and intuitive. Thus a user can rely upon the structure overview to quickly filter on particular node types, and then utilize the data view to explore on finer details—all while still keeping their original context clear. The total experience allows for easier analysis, resulting in composition of a smarter, more streamlined query.

Embodiments may also facilitate integrating graph data with other forms of database storage. That is, the results of querying graph datasets can be transformed into tables comprising rows and columns, for storage in a relational database scheme.

Moreover, graph data that is transformed into a tabular format, may be available for consumption for the large number of tools designed to integrate with relational databases (but not with graph databases). For example, the Structured Query Language (SQL) that is widely employed to interrogate and manipulate tabular relational database data, is generally not applicable to data stored in graph databases.

Further details regarding particular embodiments are now described in connection with the following specific example. This example relates to graph data in the form of information relating to a network of different users of the TWITTER social network.

EXAMPLE

In this example, the graph data is stored in the NEO4J graph database available from Neo4j of San Mateo, Calif. Data from that graph database was acquired utilizing an extension of the LUMIRA desktop available from SAP SE of Walldorf, Germany, and then stored utilizing the SAP HANA in-memory database platform.

FIG. 3 provides a simplified diagram illustrating a generic view of an interface screen according to an example. In particular, an interface screen 300 may comprise a menu portion 302, a graph visualization portion 304, and a table visualization portion 306.

Figure 4A:
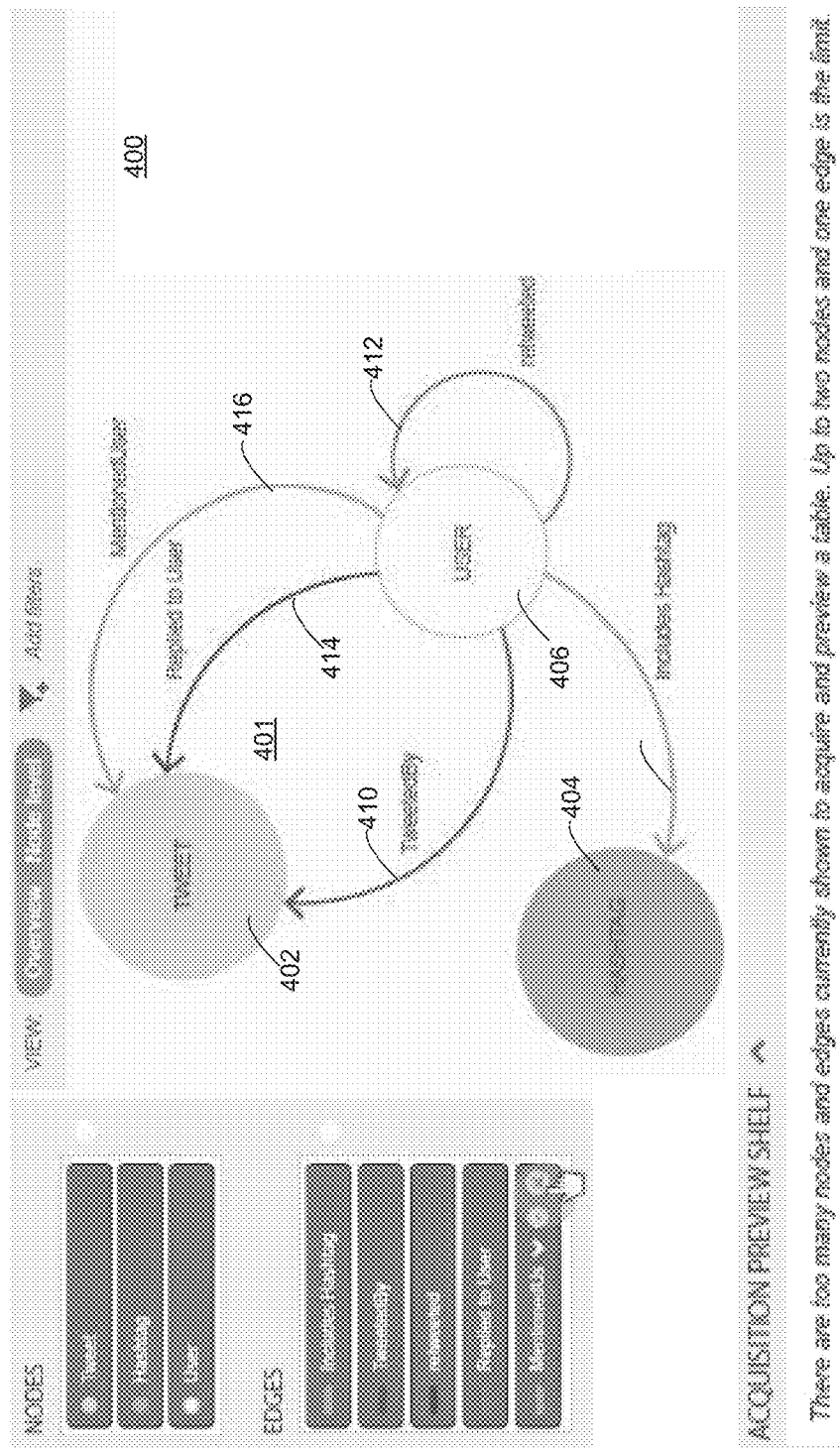

FIGS. 4A-M show various screenshots of interface screens in the example. In particular, FIG. 4A shows an initial overview interface page 400 of social network graph data 401. This social network graph data includes the following three (3) node types:
- Tweet 402;
- Hashtag 404;
- User 406.

The overview interface screen of FIG. 4A further shows the social network graph data as including the following five (5) types of edges between those node types:
- Includes Hashtag 408;
- Tweeted By 410;
- retweeted 412;
- Replied to User 414;
- Mentioned User 416.

Shown below, is a CYPHER (Neo4j language) query for populating a database with a TWITTER-like graph as discussed in this example.

CREATE (ada:user {name:"Ada", followerCount: 195}),// user nodes
  (bob:user {name:"Bob", followerCount: 246}),
  (cindy:user {name:"Cindy", followerCount: 40}),
  (david:user {name:"David", followerCount: 519}),
  (ellen:user {name:"Ellen", followerCount: 371}),
  (tweet0:tweet {text: "listen to yourself"}),//tweet nodes
  (tweet1:tweet {text: "Be positive."}),
  (tweet2:tweet {text:"Think big . . . "}),
  (tweet3:tweet {text:"Happy Birthday!"}),
  (tweet4:tweet {text: "heading to LA" }),
  (tweet5:tweet {text:"I love Vancouver!"}),
  (tweet6:tweet {text:"awesome talk!—by Dr. Hinton"}), (Hinton:hashTag {description: "Hinton"}),//hashTag nodes
(Vancouver:hashTag {description:"Vancouver"}),
(Birthday:hashTag {description:"Birthday"}),
(tweet0)-[:tweetedBy {time:10}]->(bob),//tweetedBy edges
(tweet1)-[:tweetedBy {time:1}]->(ellen),
(tweet2)-[:tweetedBy {time:5}]->(bob),
(tweet3)-[:tweetedBy {time:7}]->(david),
(tweet4)-[:tweetedBy {time:2}]->(ada),
(tweet5)-[:tweetedBy {time:9}]->(ada),
(tweet6)-[:tweetedBy {time: 1}]->(bob),
(tweet1)-[:retweet {time:11}]->(tweet6),//retweet edges
(tweet2)-[:retweet {time:13}]->(tweet1),
(tweet0)-[:retweet {time:19}]->(tweet6),
(tweet5)-[:retweet {time: 15}]->(tweet4),
(tweet1)-[:retweet {time:14}]->(tweet6),
(tweet6)-[:hasHashTag {count:1}]->(Hinton),//hasHashTag edges
(tweet5)-[:hasHashTag {count:2}]->(Vancouver),
(tweet3)-[:hasHashTag {count:1}]->(Birthday)

Figure 4B:
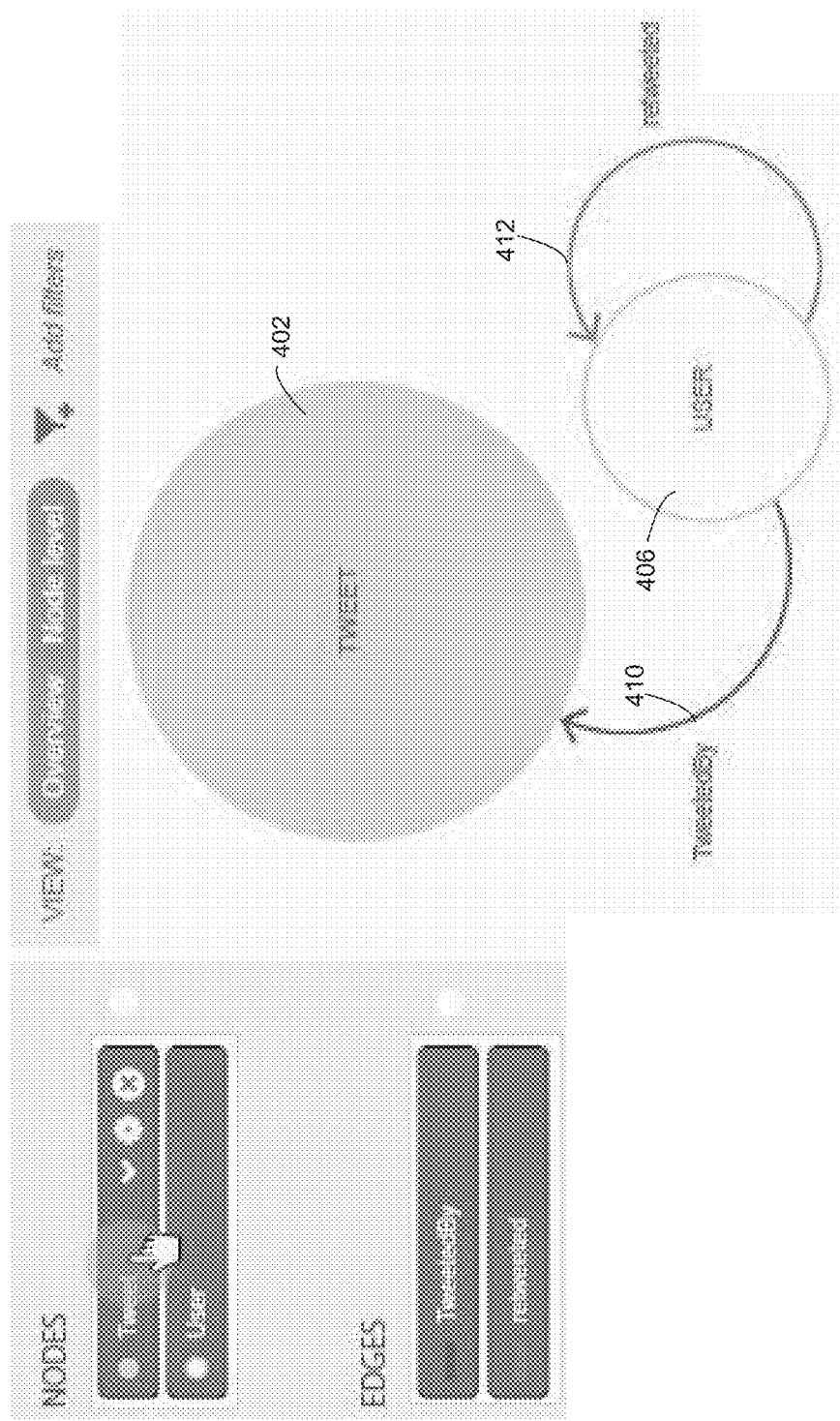

FIG. 4B shows a screenshot resulting from the user performing a filtering by deselecting a number of menu items, to leave only the following remaining:
● node type: Tweet 402;
● node type: User 406.
● edge type: Tweeted By 410;
● edge type: retweeted 412.

Figure 4C:
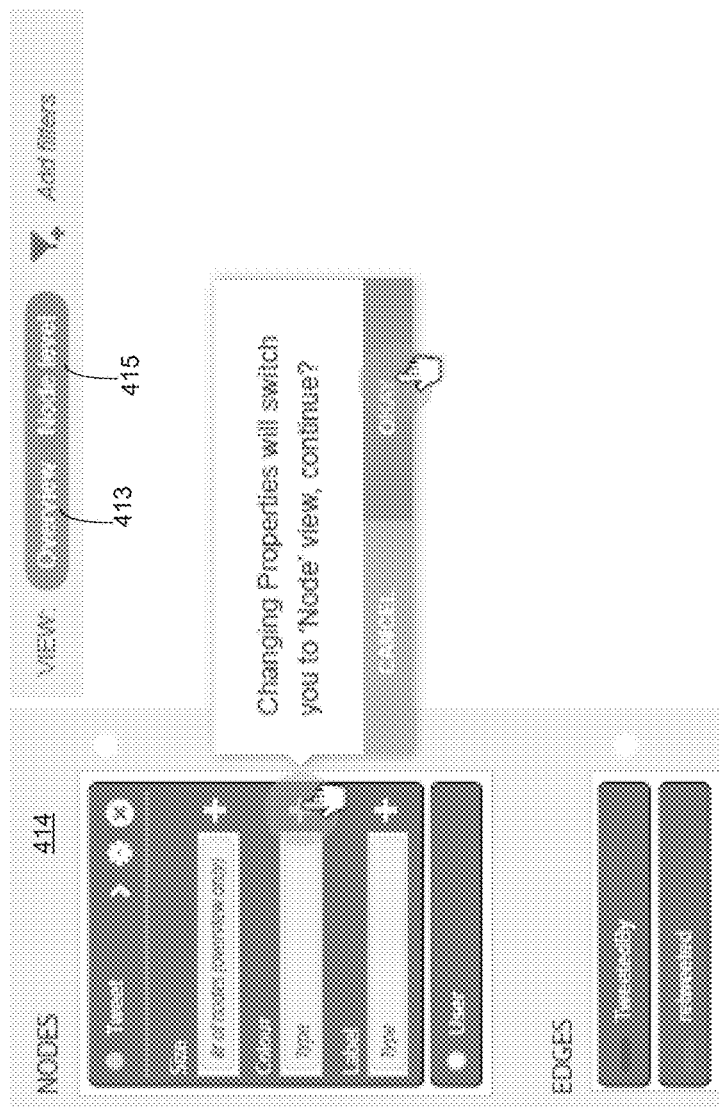

FIG. 4C shows a screenshot of the user accessing the menu portion 414 of the interface screen in order to determine an appearance of the Tweet node type. As indicated, this will change the interface screen from the Overview format 413, to the Node Level format 415.

Figure 4D:
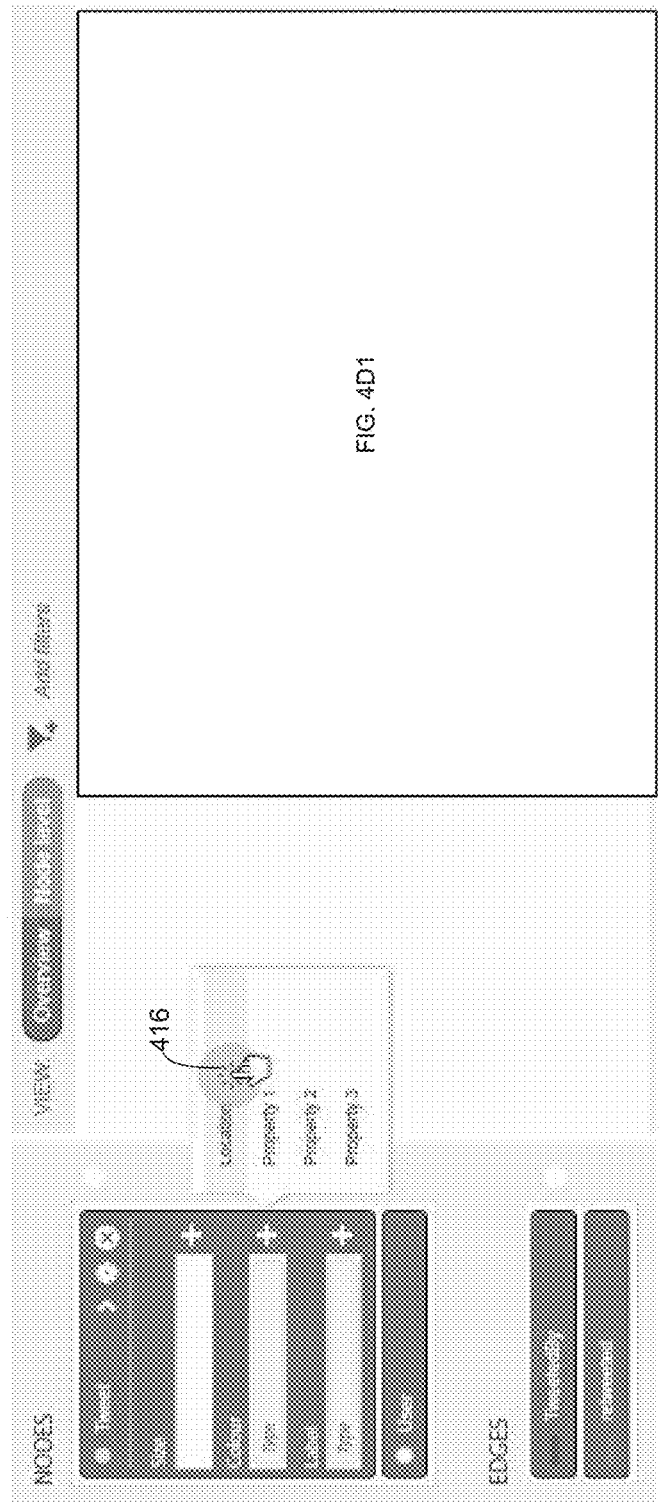

FIG. 4D shows a screenshot of the user utilizing the menu portion to instruct 416 the application to color Tweet nodes according to their locations. That is, tweets from the same location will be have the same color. Tweets from different locations will have different colors. Tweets without a location have no color assigned.

This results in the node-level display 418 of FIG. 4D1. In particular, that display includes a multiplicity of nodes of a same type 420, rather than grouping all nodes of the same type into a single icon (as in the Overview interface screen format). Tweets of a same color have a same location property value, with nodes not including that property as being present only in outline.

Figure 4E:
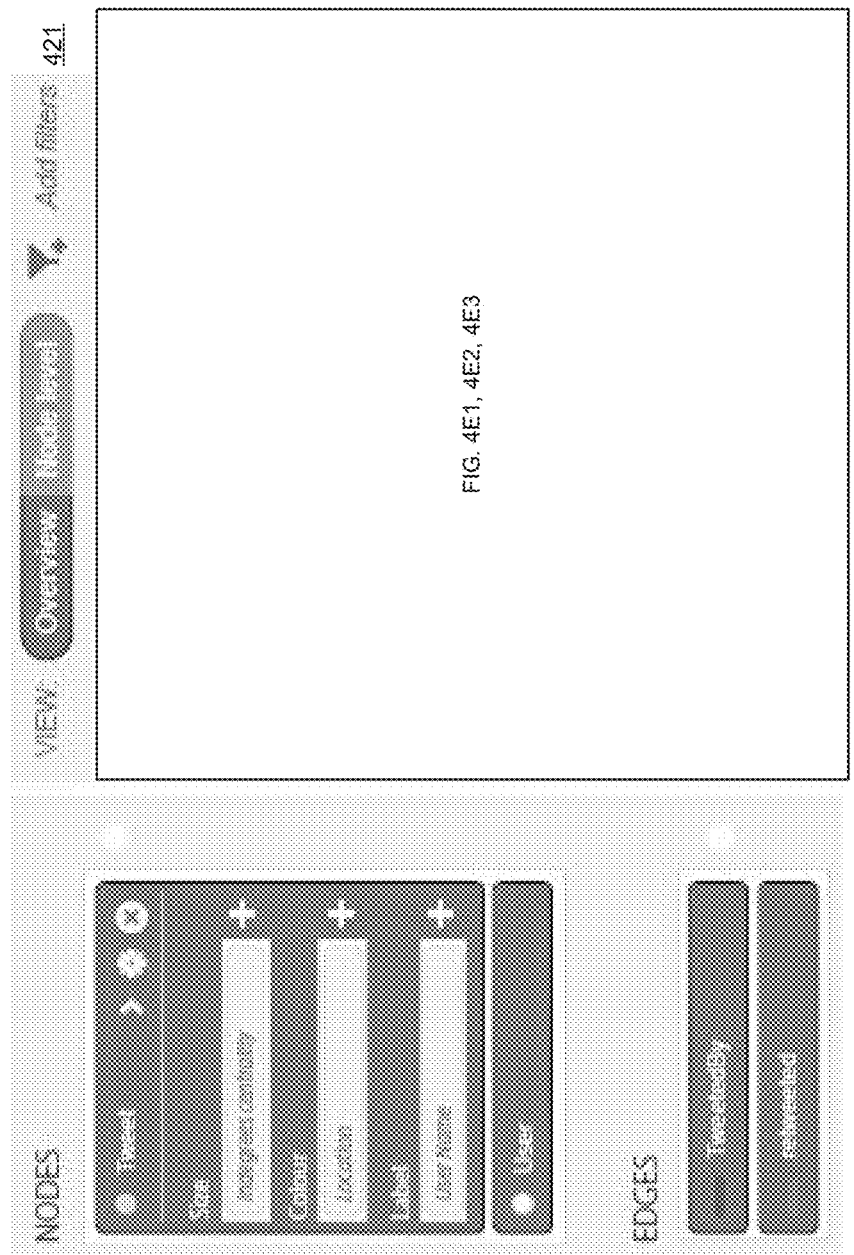

The screenshot 421 of FIG. 4E shows the user further accessing the menu portion to select the appearance of other properties of the Tweet nodes. FIG. 4E1 shows that by clicking upon a particular node, a pop-up box 422 appears indicating the node type and other details.

As shown in FIGS. 4E2-4E3, these properties may serve as a basis for further filtering activities. In particular, clicking upon the Filter button 424 of FIG. 4E1, results in a pop up box 426 of FIG. 4E2 being offered to the user. The user can select various properties of the Twitter node to serve as a filter. FIG. 4E3 shows the result 428 of the user selecting one of these properties for a filtering operation.

Figure 4F:
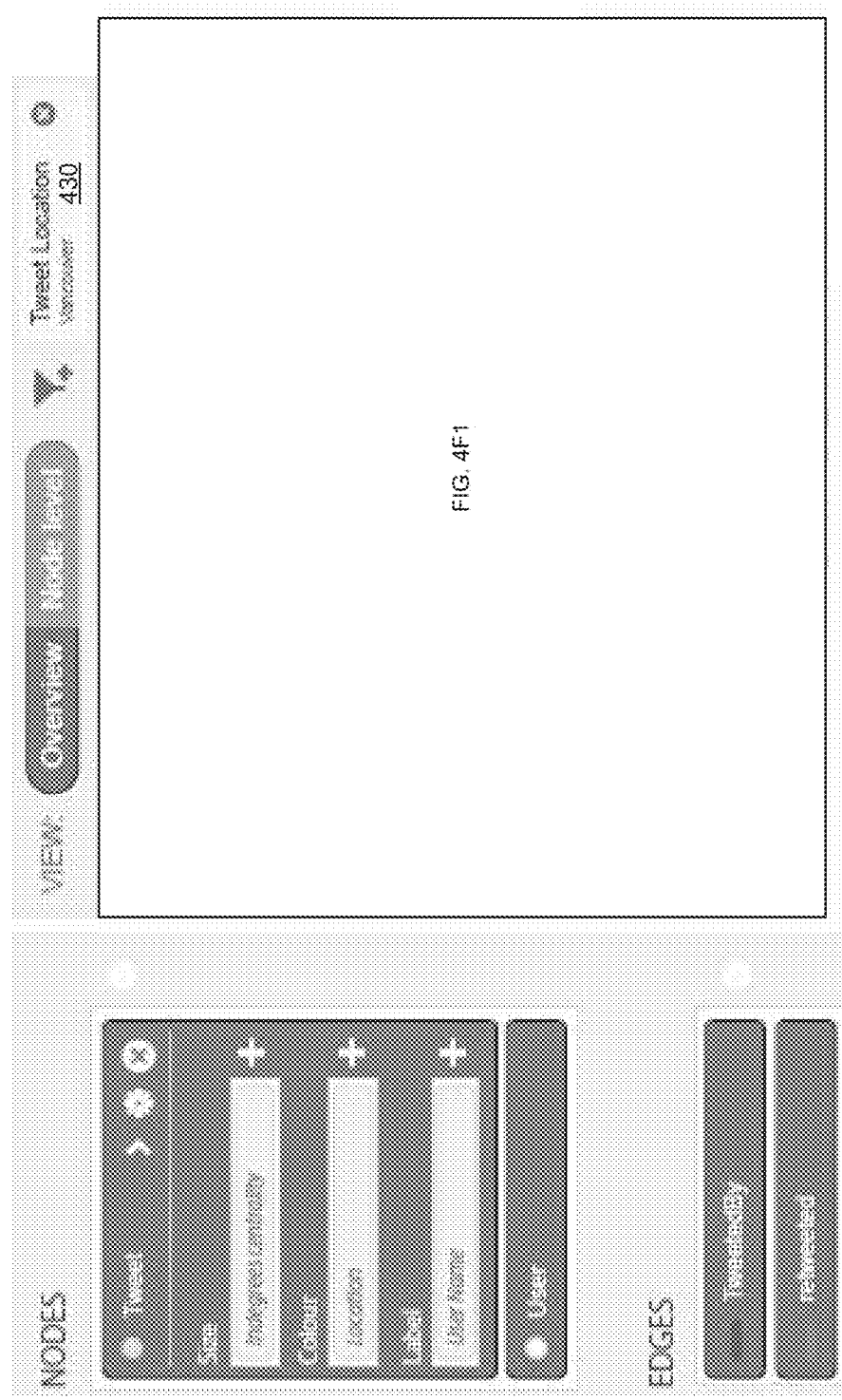

FIG. 4F shows the interface screen updated to reflect a filtering parameter 430 of "Vancouver" for the Tweet property. FIG. 4F1 shows further user interaction 432 to select certain nodes 432 and create indirect edges 433.

Figure 4G:
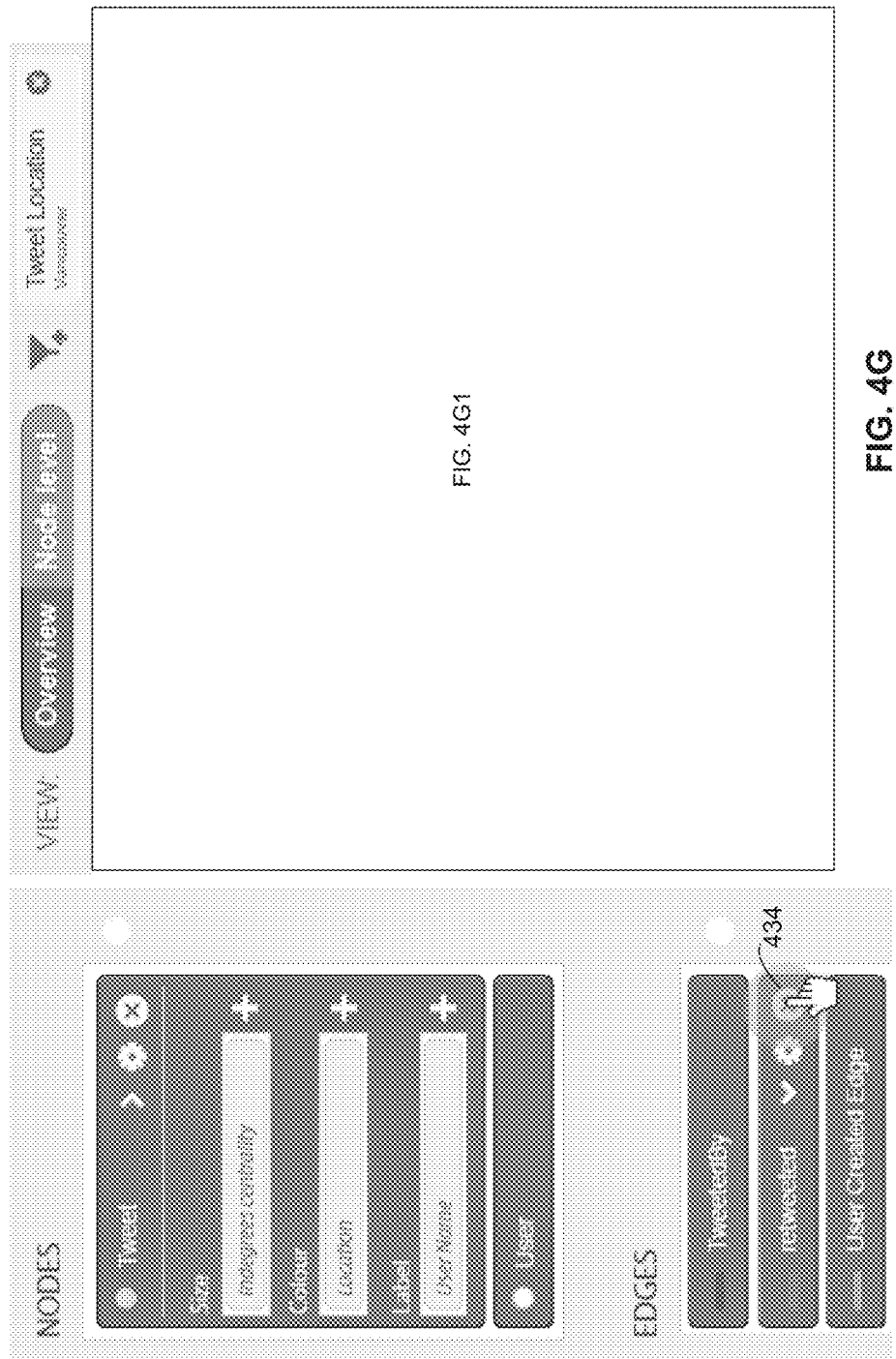

FIG. 4G shows the interface screen with user access to the edge nodes updated to exclude the retweet type 434. FIG. 4G1 shows the corresponding visualization portion 436 reflecting this input.

Until this point in the sequence of screen shots of this example, the interface screen had not included table data. In this specific example, up to two nodes and one edge is the limit for conversion of graph data to table data (see bottom of FIG. 4A).

Figure 4H:
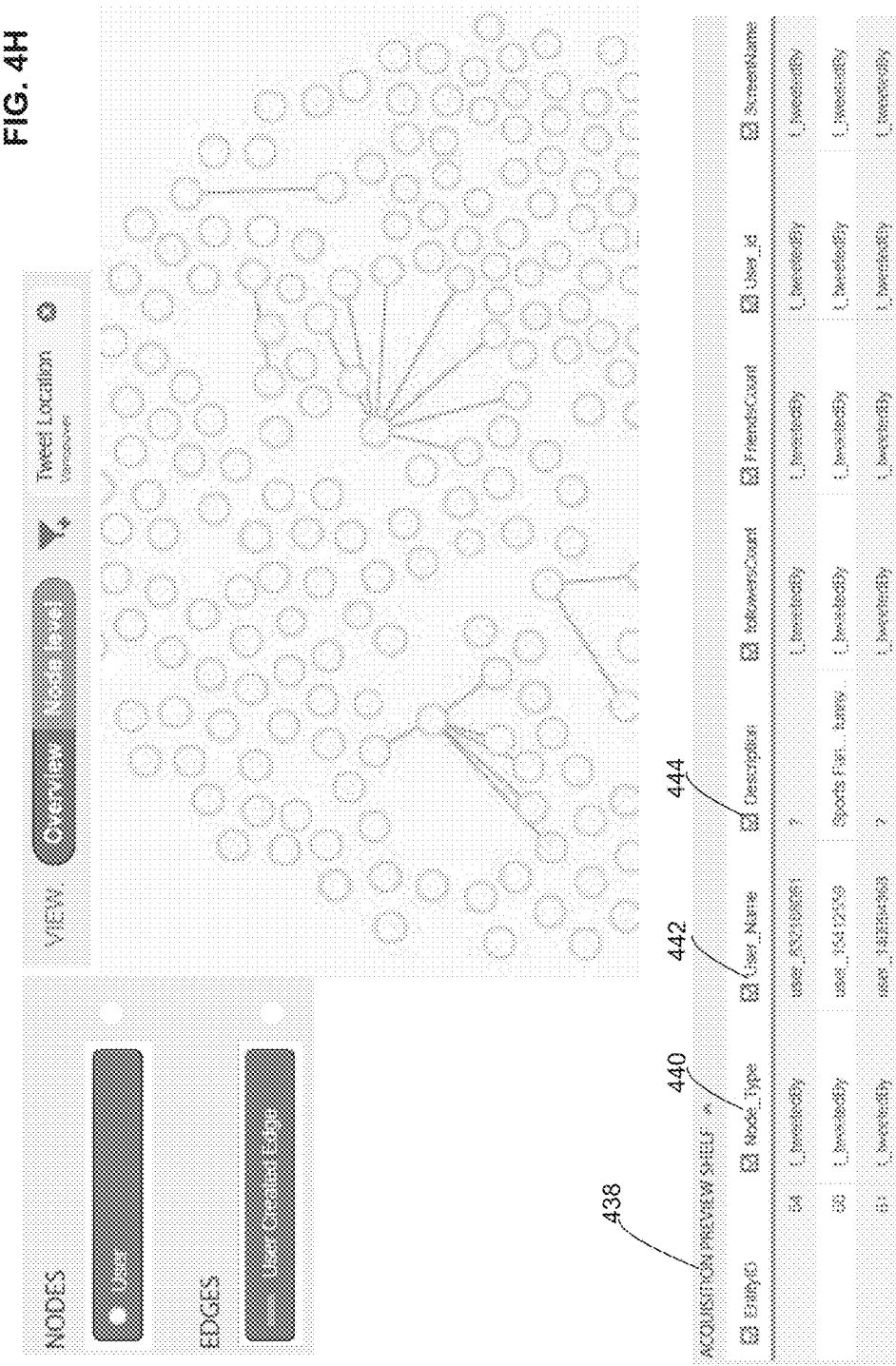

Now, a user may actively select edge/node type for conversion to tabular form. Accordingly, FIG. 4H shows an ACQUISITION PREVIEW SHELF 438 displaying the selected data in tabular form, including columns of Node-_Type 440, User_Name 442, Description 444, and others. That tabular data is amenable to storage in a relational database, such as the HANA in-memory database.

While FIG. 4H shows manual user selection of edge/node type for conversion into tables, this is not required. Alternative embodiments may automatically detect when such conditions have been met and display a preview table without explicit user instructions.

Figure 4I:
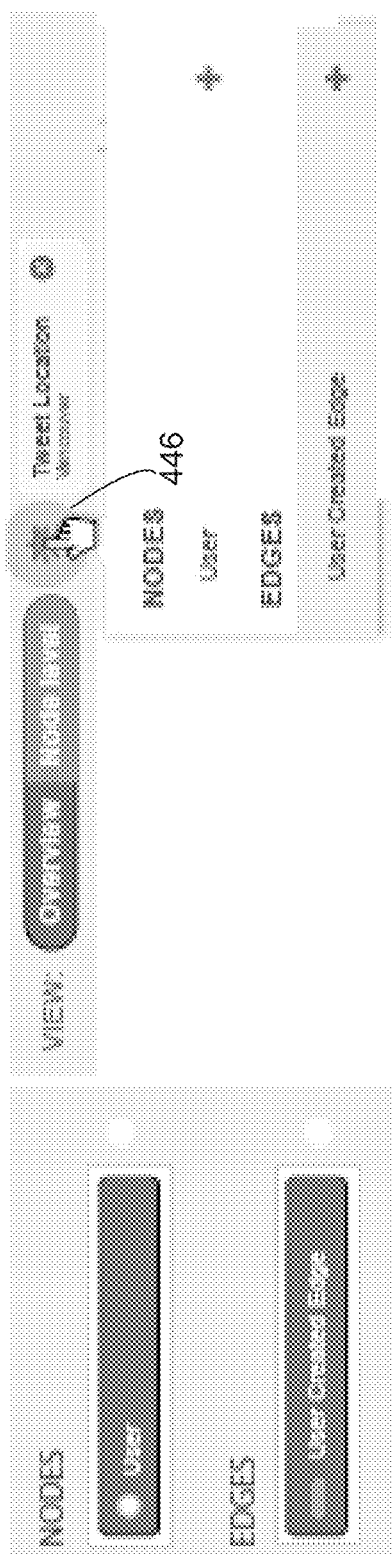
Figure 4J:
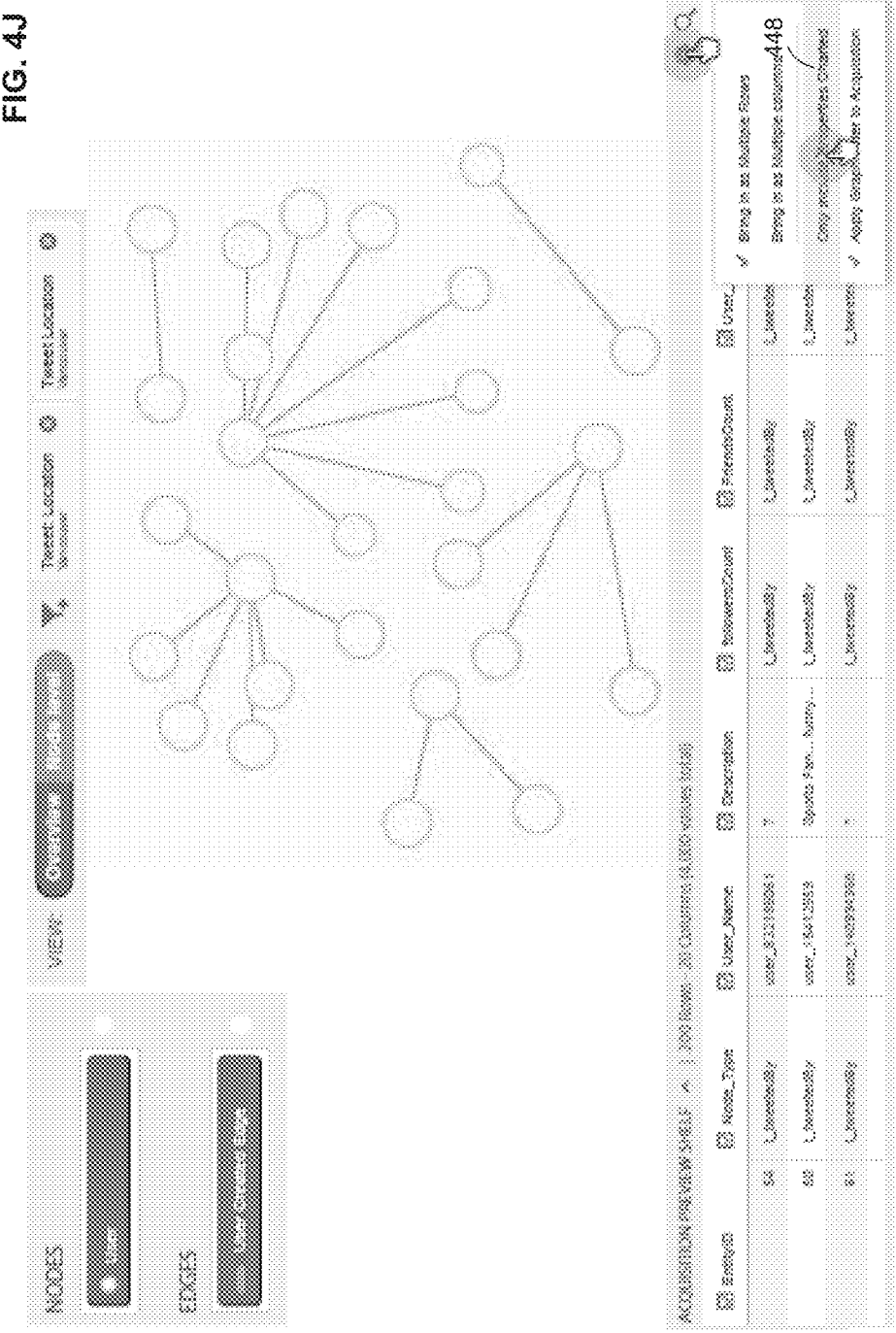

FIGS. 4I-4J show additional filtering of the data of FIG. 4H based upon various inputs 446, 448 to further narrow the displayed information. This results in a highly simplified table 450 being depicted in the screen shot of FIG. 4K. Such simplification can be useful as users probe large, complex graph-type knowledge bases with the goal of obtaining insights therefrom into the underlying data.

A sample of metadata (re: node type) in JSON format that may be inserted into a graph database query according to the above example, is:

```
{
  "requestResponse":{
    "nodeTypes":[
      {
        "id":"2",
        "name":"hashTag",
        "properties":[
          {
            "name":"description",
            "type":"String"
          }
        ],
        "count":3
      },
      {
        "id":"0",
        "name":"tweet",
        "properties":[
          {
            "name":"text",
            "type":"String"
          }
        ],
        "count":7
      },
      {
        "id":"1",
        "name":"user",
        "properties":[
          {
            "name":"name",
            "type":"String"
          },
          {
            "name":"followerCount",
            "type":"Integer"
          }
        ],
        "count":5
      }
    ],
    "edgeTypes":[
      {
        "id":"0",
        "name":"tweetedBy",
        "start":"tweet",
```

-continued

```
            "end":"user",
            "properties":[
                {
                    "name":"time",
                    "type":"Integer"
                }
            ],
            "count":7
        },
        {
            "id":"1",
            "name":"hasHashTag",
            "start":"tweet",
            "end":"hashTag",
            "properties":[
                {
                    "name":"count",
                    "type":"Integer"
                }
            ],
            "count":3
        },
        {
            "id":"2",
            "name":"retweet",
            "start":"tweet",
            "end":"tweet",
            "properties":[
                {
                    "name":"time",
                    "type":"Integer"
                }
            ],
            "count":5
        }
    ]
  }
}
```

Returning to FIG. 1, that drawing shows the engine as being part of an application layer overlying a database layer. However, this is not required and in certain embodiments the engine may be implemented by a database engine, such as an in-memory database engine.

Figure 5:
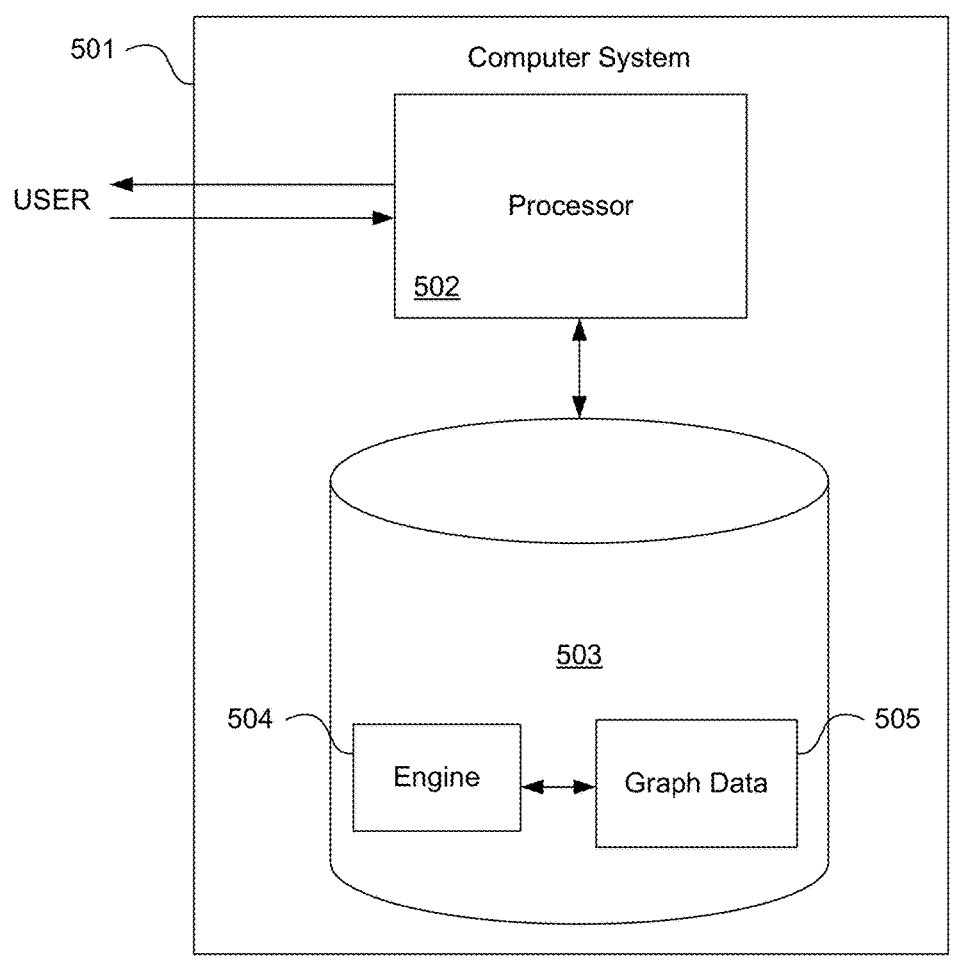
FIG. 5 illustrates hardware of a special purpose computing machine configured to afford visualization of graph data according to an embodiment.

For example, FIG. 5 illustrates hardware of a special purpose computing machine configured to render and manipulate graph database data according to an embodiment. In particular, computer system 501 comprises a processor 502 that may include executable software, which is in electronic communication with a non-transitory computer-readable storage medium 503. This computer-readable storage medium has stored thereon code 505 corresponding to a graph data. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of a database. Such an embodiment can correspond to applications performing processing by a powerful engine available as part of an in-memory database (e.g., the HANA in-memory database available from SAP SE of Walldorf, Germany). However, this not required and in certain embodiments (e.g., that shown in FIG. 1) the engine may be implemented in other ways, for example as part of an overlying application layer.

Figure 6:
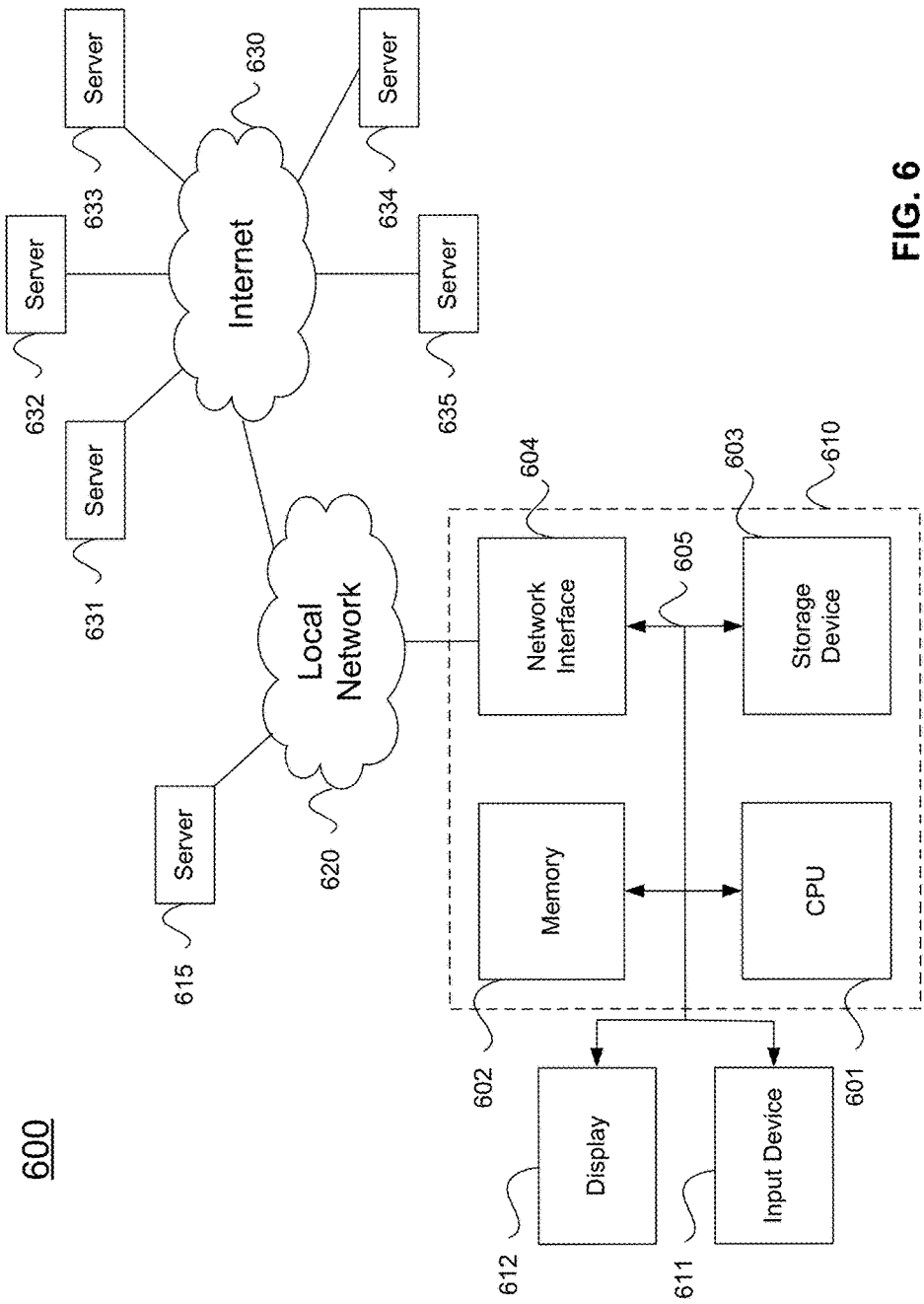
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. In certain embodiments a display could work as an input device, e.g., a touch-screen. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
an in-memory database engine accessing metadata stored in an in-memory database associated with graph data of a graph database, the metadata identifying a plurality of nodes of a first node type, a plurality of nodes of a second node type, and a plurality of edges of a first edge type between the plurality of nodes of the first node type and the plurality of nodes of the second node type;
the in-memory database engine formulating a query including the metadata;
the in-memory database engine promulgating the query to the graph database;
the in-memory database engine receiving from the graph database a query result responsive to the query;
the in-memory database engine converting the query result into a table;
the in-memory database engine saving the table to the in-memory database;
the in-memory database engine displaying the query result in an overview visualization representing all nodes of the first node type as a first icon, all nodes of the second node type as a second icon, and edges of the first edge type as a single edge between the first icon and the second icon; and
the in-memory database engine displaying the query result in a node level visualization rendering,
each of the plurality of nodes of the first node type and each of the plurality nodes of the second node type as separate nodes; and
each of the plurality of edges of the first edge type as separate edges.

2. The method as in claim 1 wherein the metadata is in JavaScript Object Notation (JSON) format.

3. The method as in claim 1 wherein the converting is based upon the in-memory database engine receiving an input specifying the first node type.

4. The method as in claim 1 wherein the converting is based upon the in-memory database engine receiving an input specifying the first edge type.

5. The method as in claim 1 wherein the converting is based upon the in-memory database engine receiving an input specifying a plurality of edge types and a plurality of node types displayed in an overview visualization of the query result.

6. A non-transitory computer readable storage medium embodying a computer program for performing a method, said method comprising:
an in-memory database engine accessing metadata stored in an in-memory database associated with graph data of a graph database, the metadata identifying a plurality of nodes of a first node type, a plurality of nodes of a second node type, and a plurality of edges of a first edge type between the plurality of nodes of the first node type and the plurality of nodes of the second node type;
the in-memory database engine formulating a query including the metadata;
the in-memory database engine promulgating the query to the graph database;
the in-memory database engine receiving from the graph database a query result responsive to the query;
the in-memory database engine converting the query result into a table;
the in-memory database saving the table in the in-memory database;
the in-memory database engine displaying the query result in an overview visualization representing all nodes of the first node type as a first icon, all nodes of the second node type as a second icon, and edges of the first edge type as a single edge between the first icon and the second icon; and
the in-memory database engine displaying the query result in a node level visualization rendering,
each of the plurality of nodes of the first node type and each of the plurality nodes of the second node type as separate nodes; and
each of the plurality of edges of the first edge type as separate edges.

7. The non-transitory computer readable storage medium as in claim 6 wherein the metadata is in JavaScript Object Notation (JSON) format.

8. The non-transitory computer readable storage medium as in claim 6 wherein the converting is based upon an input specifying the first node type or the first edge type.

9. The non-transitory computer readable storage medium as in claim 6 wherein the converting is based upon the in-memory database engine receiving an input specifying a plurality of edge types and a plurality of node types displayed in the overview visualization.

10. A computer system comprising:
one or more processors;
a software program, executable on said computer system, the software program configured to cause an in-memory database engine to:
access from an in-memory database, metadata associated with graph data of a graph database, the metadata identifying a plurality of nodes of a first node type, a plurality of nodes of a second node type, and a plurality of edges of a first edge type between the plurality of nodes of the first node type and the plurality of nodes of the second node type;
formulate a query including the metadata;
promulgate the query to the graph database; and
receive from the graph database a query result responsive to the query,
wherein the software program is further configured to cause the in-memory database engine to,
convert the query result into a table,
save the table in the in-memory database,
display the query result in an overview visualization representing all nodes of the first node type as a first icon, all nodes of the second node type as a second icon, and edges of the first edge type as a single edge between the first icon and the second icon, and
display the query result in a node level visualization rendering,
each of the plurality of nodes of the first node type and each of the plurality nodes of the second node type as separate nodes; and
each of the plurality of edges of the first edge type as separate edges.

11. The computer system as in claim 10 wherein the software program is configured to cause in-memory database engine to convert the query result into the table in response to an input specifying a plurality of edge types and a plurality of node types displayed in the overview visualization.

12. The computer system as in claim 10 wherein the metadata is in JSON format.

* * * * *